US012573618B2

(12) United States Patent
Kim et al.

(10) Patent No.: US 12,573,618 B2
(45) Date of Patent: ***Mar. 10, 2026

(54) ALL-SOLID SECONDARY BATTERY AND METHOD OF PREPARING THE SAME

(71) Applicant: Samsung Electronics Co., Ltd., Suwon-si (KR)

(72) Inventors: Sewon Kim, Suwon-si (KR); Sungkyun Jung, Suwon-si (KR); Naoki Suzuki, Yokohama (JP); Satoshi Fujiki, Yokohama (JP); Tomoyuki Tsujimura, Yokohama (JP); Hyeokjo Gwon, Hwaseong-si (KR); Jusik Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 564 days.

This patent is subject to a terminal disclaimer.

(21) Appl. No.: 18/153,171

(22) Filed: Jan. 11, 2023

(65) Prior Publication Data

US 2023/0163279 A1 May 25, 2023

Related U.S. Application Data

(63) Continuation-in-part of application No. 17/093,989, filed on Nov. 10, 2020, now Pat. No. 11,605,812.

(30) Foreign Application Priority Data

Mar. 9, 2020 (KR) ........................ 10-2020-0029166

(51) Int. Cl.
*H01M 4/00* (2006.01)
*H01M 4/04* (2006.01)
(Continued)

(52) U.S. Cl.
CPC ........... *H01M 4/366* (2013.01); *H01M 4/043* (2013.01); *H01M 4/133* (2013.01); *H01M 4/134* (2013.01);
(Continued)

(58) Field of Classification Search
CPC .. H01M 4/134; H01M 10/0562; H01M 4/133; H01M 4/043; H01M 4/587; H01M 2004/027
See application file for complete search history.

(56) References Cited

U.S. PATENT DOCUMENTS 6,402,795 B1 6/2002 Chu et al.
9,570,749 B2 2/2017 Yoon et al.
(Continued)

FOREIGN PATENT DOCUMENTS

CN 102054966 A 5/2011
CN 102694200 A 12/2014
(Continued)

OTHER PUBLICATIONS

Krauskopf et al., "Diffusion Limitation of Lithium Metal and Li—Mg Alloy Anodes on LLZO Type Solid Electrolytes as a Function of Temperature and Pressure", Advanced Energy Materials, 9, 2019, 1902568 p. 1-13.
(Continued)

*Primary Examiner* — Tiffany Legette
*Assistant Examiner* — Monique M Wills
(74) *Attorney, Agent, or Firm* — CANTOR COLBURN LLP

(57) ABSTRACT

An all-solid secondary battery, including: a cathode; an anode; and a solid electrolyte disposed between the cathode and the anode, wherein the anode includes an anode current collector; a first anode active material layer in contact with the anode current collector and including a first metal; a (Continued)

second anode active material layer disposed between the first anode active material layer and the solid electrolyte and including a carbon-containing active material; and a contact layer between the second anode active material layer and the solid electrolyte, the contact layer including a second metal, and having a thickness less than a thickness of the first anode active material layer, wherein the second metal includes lithium metal, a lithium alloy, a metal alloyable with lithium, or a combination thereof.

26 Claims, 30 Drawing Sheets

(51) Int. Cl.

| | |
|---|---|
| *H01M 4/133* | (2010.01) |
| *H01M 4/134* | (2010.01) |
| *H01M 4/1393* | (2010.01) |
| *H01M 4/1395* | (2010.01) |
| *H01M 4/36* | (2006.01) |
| *H01M 4/38* | (2006.01) |
| *H01M 4/40* | (2006.01) |
| *H01M 4/587* | (2010.01) |
| *H01M 10/0562* | (2010.01) |
| *H01M 10/0585* | (2010.01) |
| *H01M 4/02* | (2006.01) |

(52) U.S. Cl.

CPC ....... *H01M 4/1393* (2013.01); *H01M 4/1395* (2013.01); *H01M 4/382* (2013.01); *H01M 4/405* (2013.01); *H01M 4/587* (2013.01); *H01M 10/0562* (2013.01); *H01M 10/0585* (2013.01); *H01M 2004/021* (2013.01); *H01M 2004/027* (2013.01); *H01M 2300/0071* (2013.01)

(56) References Cited

U.S. PATENT DOCUMENTS

| | | | |
|---|---|---|---|
| 9,590,249 | B2 | 3/2017 | Moriwaka et al. |
| 10,326,136 | B2 | 6/2019 | Xiao et al. |
| 10,497,930 | B2 | 12/2019 | Lee et al. |
| 10,985,407 | B2 | 4/2021 | Suzuki et al. |
| 2013/0045423 | A1 | 2/2013 | Lim et al. |
| 2015/0333376 | A1 | 11/2015 | Gaben |
| 2017/0092950 | A1 | 3/2017 | Xiao et al. |
| 2017/0117573 | A1 | 4/2017 | Upadhyaya |
| 2017/0125805 | A1 | 5/2017 | Carberry et al. |
| 2017/0133662 | A1 | 5/2017 | Cui et al. |
| 2018/0205112 | A1 | 7/2018 | Thomas-Alyea et al. |
| 2018/0226633 | A1 | 8/2018 | Fujiki et al. |
| 2019/0044186 | A1 | 2/2019 | Kim et al. |
| 2019/0131616 | A1 | 5/2019 | Tomizawa et al. |
| 2019/0140311 | A1* | 5/2019 | Hasegawa ........... H01M 50/574 |
| 2019/0157723 | A1 | 5/2019 | Suzuki et al. |
| 2019/0165357 | A1 | 5/2019 | Senoue |
| 2019/0393505 | A1 | 12/2019 | Suzuki et al. |
| 2020/0067075 | A1 | 2/2020 | Choi et al. |
| 2020/0328465 | A1 | 10/2020 | Sakaida et al. |
| 2020/0365892 | A1 | 11/2020 | Han et al. |
| 2021/0119203 | A1 | 4/2021 | Kim et al. |
| 2021/0184219 | A1 | 6/2021 | Sawada et al. |
| 2021/0242495 | A1 | 8/2021 | Kim et al. |
| 2021/0257606 | A1 | 8/2021 | Kim et al. |

FOREIGN PATENT DOCUMENTS

| | | |
|---|---|---|
| JP | 2015146320 A | 8/2015 |
| JP | 2017117803 A | 6/2017 |
| JP | 2019087346 A | 6/2019 |
| JP | 2019096610 A | 6/2019 |
| JP | 2019145299 A | 8/2019 |
| JP | 2019160407 A | 9/2019 |
| KR | 1020120089512 A | 8/2012 |
| KR | 1020150103041 A | 9/2015 |
| KR | 1020150128399 A | 11/2015 |
| KR | 1020180020599 A | 2/2018 |
| KR | 1020180091678 A | 8/2018 |
| KR | 1020180103725 A | 9/2018 |
| KR | 1020190065817 A | 6/2019 |
| KR | 1020210047795 A | 4/2021 |
| WO | 2019216216 A1 | 11/2019 |
| WO | 2020072524 A1 | 4/2020 |
| WO | 2020176905 A1 | 9/2020 |

OTHER PUBLICATIONS

Thorben Krauskopf et al., "Toward a Fundamental Understanding of the Lithium Metal Anode in Solid-State Batteries 炬 An Electrochemo-Mechanical Study on the Garnet-Type Solid Electrolyte Li6.25Al0.25La3Zr2O12," ACS Appl. Mater. Interfaces, Mar. 20, 2019, pp. 14463-14477, vol. 11.

William Manalastas Jr. et al., "Mechanical failure of garnet electrolytes during Li electrodeposition observed by in-operando microscopy," Journal of Power Sources, 2019, pp. 287-293, vol. 412.

English Translation of Office Action dated Mar. 4, 2025, issued in corresponding JP Patent Application No. 2022-554369, 6 pp.

Extended European Search Report issued in corresponding EP Patent Application No. 21769029.6, 8 pp.

Office Action dated Mar. 4, 2025, issued in corresponding JP Patent Application No. 2022-554369, 5 pp.

* cited by examiner

ALL-SOLID SECONDARY BATTERY AND METHOD OF PREPARING THE SAME

CROSS-REFERENCE TO RELATED APPLICATION

This application is a Continuation-In-Part of U.S. patent application Ser. No. 17/093,989, filed on Nov. 10, 2020, now U.S. Pat. No. 11,605,812, and claims priority to and the benefit of Korean Patent Application No. 10-2020-0029166, filed on Mar. 9, 2020, in the Korean Intellectual Property Office, and all the benefits accruing therefrom under 35 U.S.C. §§ 119, 120, the contents of which are incorporated herein by reference in their entirety.

BACKGROUND

1. Field

The present disclosure relates to an all-solid secondary battery and a method of preparing the all-solid secondary battery.

2. Description of the Related Art

Recently, in accordance with industrial demand, batteries having high energy density and high safety have been developed. For example, lithium-ion batteries have been put to practical use in the automotive field as well as in information-related equipment and communication equipment. In the field of automobiles, lithium-ion battery safety is particularly important.

Currently available lithium-ion batteries include an electrolyte solution including a flammable organic solvent, and thus when short-circuit occurs, there is a potential for overheating of the organic solvent and the occurrence of a fire. In this regard, an all-solid secondary battery including a solid electrolyte instead of an electrolytic solution has been proposed.

In an all-solid secondary battery, a flammable organic solvent is not used, and thus the potential for a fire to occur, or an explosion, even when short-circuit occurs, may be reduced. Therefore, an all-solid secondary battery may have greatly increased safety as compared to a lithium-ion battery using an electrolyte.

To increase the energy density of such an all-solid secondary battery, lithium may be used as an anode active material. For example, the specific capacity (capacity per unit mass) of lithium is about 10 times greater than the specific capacity of graphite (often used as an anode active material). Thus, when lithium is used as an anode active material, an all-solid secondary battery may be manufactured in the form of a thin film and may have an increased output.

However, there remains a need for improved all-solid secondary batteries in which a short circuit is less likely to occur.

SUMMARY

Provided is an all-solid secondary battery and a method of preparing the all-solid secondary battery, wherein the formation of cracks in a solid electrolyte may be prevented and an interfacial resistance between an anode and the solid electrolyte may be reduced in the all-solid secondary battery.

Additional aspects will be set forth in part in the description which follows and, in part, will be apparent from the description, or may be learned by practice of the presented embodiments of the disclosure.

According to an aspect of an embodiment, an all-solid secondary battery includes a cathode, an anode, and a solid electrolyte disposed between the cathode and the anode, wherein the anode includes an anode current collector, a first anode active material layer in contact with the anode current collector and including a first metal; a second anode active material layer disposed between the first anode active material layer and the solid electrolyte and including a carbon-containing active material; and a contact layer disposed between the second anode active material layer and the solid electrolyte, the contact layer including a second metal, and having a thickness less than a thickness of the first anode active material layer, wherein the second metal comprises at least one of lithium metal, a lithium alloy, and a metal alloyable with lithium, or a combination thereof.

The first metal may include lithium metal or a lithium alloy, and the second metal may include lithium metal or a lithium alloy.

The first metal and the second metal may be the same.

The thickness of the contact layer may be about 20% or less of the thickness of the first anode active material layer.

The thickness of the contact layer may be about 0.5% ($\frac{1}{200}$) or less of the thickness of the first anode active material layer.

The thickness of the contact layer may be about 0.1% ($\frac{1}{1000}$) or greater of a thickness of the first anode active material layer.

The thickness of the contact layer may be about 0.1% to about 20% of the thickness of the first anode active material layer.

The thickness of the contact layer may be about 1 micrometer ($\mu$m) or less.

The thickness of the contact layer may be 30 nanometers (nm) or greater.

The thickness of the contact layer may be about 30 nanometers to about 1 micrometer.

The thickness of the contact layer may be less than a thickness of the second anode active material layer.

During a charge/discharge cycle, a volume change of the first anode active material layer may be greater than a volume change of the contact layer.

During a charge/discharge cycle, a volume change of the second anode active material layer may be greater than a volume change of the contact layer.

A volume of the contact layer after charge may be about 1.5 times to about 20 times a volume of the contact layer after discharge.

A volume of the first anode active material layer after charge may be about 1.5 times to about 500 times a volume of the first anode active material layer after discharge.

A volume of the second anode active material layer after charge may be greater than a volume of the second anode active material layer after discharge and the volume of the second anode active material layer after charge may be about 2 times or less the volume of the second anode active material layer after discharge.

The solid electrolyte may include an oxide-containing solid electrolyte.

According to an aspect of another embodiment, a method of preparing an all-solid secondary battery may include providing a cathode; providing an anode; providing a solid electrolyte; attaching the anode to a surface of the solid electrolyte; and attaching the cathode to another surface of the solid electrolyte, wherein the providing of the anode includes: disposing a first layer including lithium metal or a lithium alloy on a first substrate; disposing a second layer including a carbon-containing active material on a second substrate; disposing the first layer and the second layer to face each other; and pressing the first substrate and the second substrate such that the first substrate and the second substrate move closer to each other, wherein in the process of pressing the first substrate and the second substrate, a third layer including lithium metal or a lithium alloy may be formed between the second substrate and the second layer, and the third layer has a thickness less than a thickness of the first layer.

The second layer may include a metal alloyable with lithium, and in the pressing of the first substrate and the second substrate the metal alloyable with lithium may form an alloy with lithium in the first layer and in the third layer.

The providing of the anode may further include removing the second substrate after the forming of the third layer.

A pressure applied in the pressing of the first substrate and the second substrate may be about 150 megapascals (MPa) to about 1,000 megapascals.

According to an aspect of another embodiment, a method of preparing an anode of an all-solid secondary battery may include preparing a first layer including lithium metal or a lithium alloy disposed on a first substrate and a second layer including a carbon-containing active material disposed on a second substrate; disposing the first layer and the second layer to face each other; and pressing the first substrate and the second substrate such that the first substrate and the second substrate to be close to each other, wherein in the pressing of the first substrate and the second substrate, a third layer including lithium metal or a lithium alloy and having a thickness less than that of the first layer may be formed between the second substrate and the second layer.

The second layer may include a metal alloyable with lithium, and the metal may form alloy with lithium in the first layer and the third layer in the pressing of the first substrate and the second substrate.

In the preparing of the anode, the second substrate may be removed after the forming of the third layer.

A pressure applied in the pressing of the first substrate and the second substrate may be about 150 MPa or higher.

According to an aspect of an embodiment, a method of manufacturing an all-solid secondary battery the method including providing a first stack including a first layer including lithium metal or a lithium alloy on a first substrate, and a second layer including a carbon-containing active material on the first layer; providing a second stack including a third layer disposed on a solid electrolyte, wherein the third layer includes lithium metal, a lithium alloy, a metal alloyable with lithium, or a combination thereof; disposing the first stack on the second stack such that the second layer and the third layer face each other, and pressing the first stack and the second stack such that the first stack and the second stack move closer to each other to attach the second layer to the third layer, and providing a cathode on the solid electrolyte opposite the third layer to manufacture the all-solid secondary battery, wherein the third layer is disposed between the second layer and the solid electrolyte, and a thickness of the third layer is be less than a thickness of the first layer.

The providing the first stack may include providing the first layer disposed on the first substrate and the second layer disposed on a second substrate, and disposing the first layer and the second layer to face each other, and pressing the first substrate and the second substrate such that the first layer and the second layer move closer to each other.

In the preparing the first stack, the second substrate may be removed from the second layer, and the first substrate may be an anode current collector.

According to an aspect of an embodiment, a method of manufacturing an all-solid secondary battery the method including providing a first stack including a first layer including lithium metal or a lithium alloy on a first substrate; providing a second stack including a second layer including a carbon-containing active material, and a third layer disposed on a solid electrolyte, wherein the third layer includes lithium metal, a lithium alloy, a metal alloyable with lithium, or a combination thereof; disposing the first stack and the second stack such that the first layer and the second layer face each other; pressing the first stack and the second stack such that the first stack and the second stack move closer to each other to attach the first layer to the second layer; and providing a cathode on the solid electrolyte opposite the third layer to manufacture the all-solid secondary battery, wherein the third layer is thinner than the first layer.

The providing the second stack may include providing the third layer disposed on the solid electrolyte and the second layer disposed on a second substrate, and disposing the third layer and the second layer to face each other, and pressing the second substrate and the solid electrolyte such that the third layer and the second layer move closer to each other.

In the providing the second stack, the second substrate may be removed from the second layer, and the first substrate may be an anode current collector.

According to an aspect, a solid electrolyte/anode stack subassembly for an all-solid secondary battery, the solid electrolyte/anode stack subassembly includes: an anode current collector; a first anode active material layer in contact with the anode current collector and including a first metal; a second anode active material layer disposed between the first anode active material layer and a solid electrolyte, and including a carbon-containing active material; and a contact layer between the second anode active material layer and the solid electrolyte, the contact layer including a second metal, and having a thickness less than a thickness of the first anode active material layer, wherein the second metal includes lithium metal, a lithium alloy, a metal alloyable with lithium, or a combination thereof.

According to an aspect, a method of manufacturing the solid electrolyte/anode stack subassembly, the method may include providing a first stack including a first layer including lithium metal or a lithium alloy on a first substrate, and a second layer including a carbon-containing active material on the first layer; providing a second stack including a third layer disposed on a solid electrolyte, wherein the third layer includes lithium metal, a lithium alloy, a metal alloyable with lithium, or a combination thereof; and disposing the first stack on the second stack such that the second layer and the third layer face each other, and pressing the first stack and the second stack such that the first stack and the second stack move closer to each other to attach the second layer to the third layer, wherein the third layer is disposed between the second layer and the solid electrolyte, and a thickness of the third layer is less than a thickness of the first layer.

According to an aspect, a method of manufacturing the solid electrolyte/anode stack subassembly, the method may include providing a first stack including a first layer including lithium metal or a lithium alloy on a first substrate; providing a second stack including a second layer including a carbon-containing active material, and a third layer disposed on a solid electrolyte, wherein the third layer includes lithium metal, a lithium alloy, a metal alloyable with lithium, or a combination thereof; disposing the first stack and the second stack such that the first layer and the second layer face each other; and pressing the first stack and the second stack such that the first stack and the second stack move closer to each other to attach the first layer to the second layer, wherein the third layer is thinner than the first layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
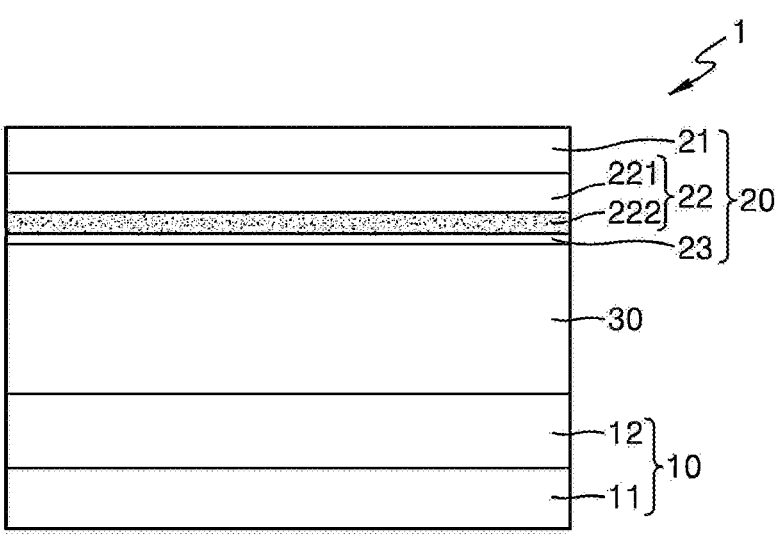
FIG. 1 is a cross-sectional view that illustrates an exemplary embodiment of an all-solid secondary battery.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. "Or" means "and/or." As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value. End points in ranges may be independently combined.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an all-solid secondary battery according to an embodiment, an anode used in the all-solid secondary battery, and a method of preparing the all-solid secondary battery will be described in detail with reference to the accompanying drawings. Like reference numerals in the drawings denote like elements. Sizes of components in the drawings may be exaggerated for convenience of explanation. Hereinafter, one or more embodiments described below are merely illustrative, and various modifications are possible from these embodiments.

In an all-solid secondary battery including a solid electrolyte as an electrolyte and lithium as an anode active material, lithium metal may be irregularly deposited on a surface of the solid electrolyte during a charging process, and this may cause cracks in the solid electrolyte. The cracks of the solid electrolyte may result in a short-circuit of the all-solid secondary battery. The present disclosure provides an all-solid secondary battery including a thin contact layer including a metal between an anode active material layer and the solid electrolyte to minimize generation of cracks and the occurrence of a short-circuit.

Figure 2:
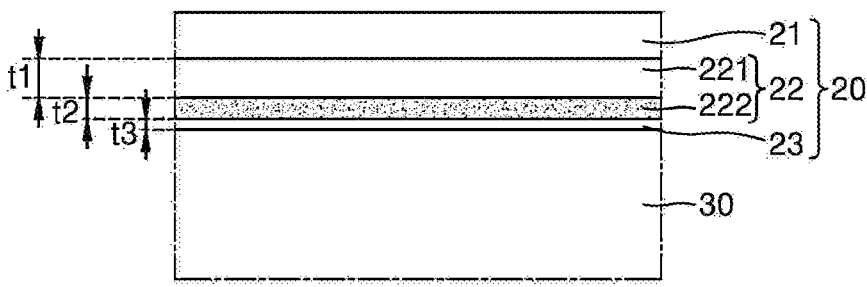
FIG. 2 is a cross-sectional view that illustrates the anode in FIG. 1.
Figure 3:
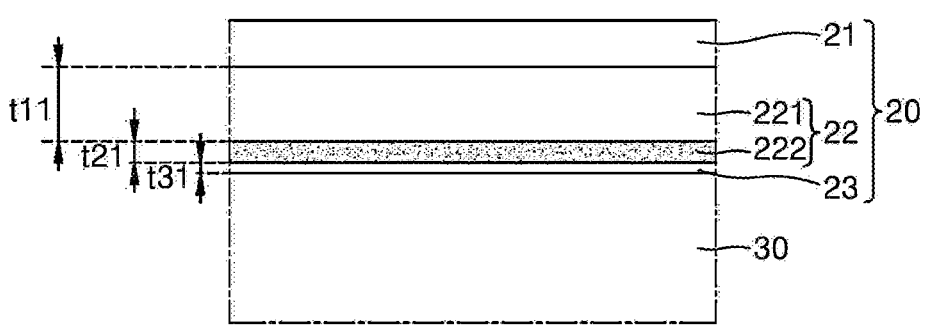
FIG. 3 is a cross-sectional view of an exemplary embodiment of an anode of an all-solid secondary battery after charge.
Figure 4:
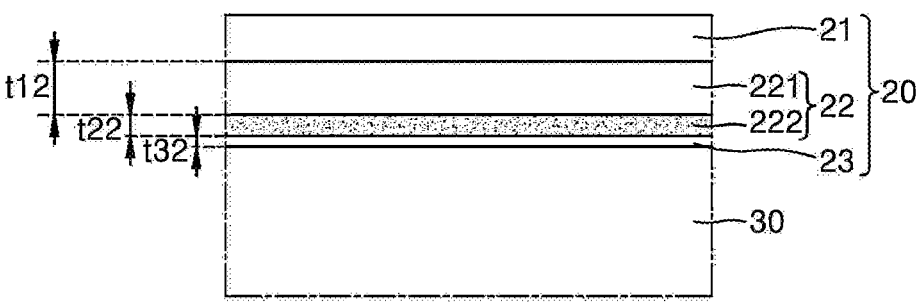
FIG. 4 is cross-sectional view of the anode of the all-solid secondary battery after discharge.

FIG. 1 is a cross-sectional view illustrating an all-solid secondary battery 1 according to an embodiment, and FIG. 2 is a cross-sectional view illustrating an anode 20 in FIG. 1. FIGS. 3 and 4 are views illustrating the effect of charge and discharge on the anode 20 of the all-solid secondary battery 1.

Referring to FIGS. 1 and 2, the all-solid secondary battery 1 according to an embodiment is a secondary battery that includes a solid electrolyte as an electrolyte. For example, the all-solid secondary battery 1 may be an all-solid lithium ion secondary battery, in which lithium ions migrate between a cathode 10 and the anode 20.

The all-solid secondary battery 1 includes the cathode 10 (also referred to herein as the cathode), a solid electrolyte 30, and the anode 20 (also referred to herein as the anode).

Cathode

The cathode 10 may include a cathode current collector 11 and a cathode active material layer 12.

For example, the cathode current collector 11 may be a plate or a foil including indium (In), copper (Cu), magnesium (Mg), stainless steel, titanium (Ti), iron (Fe), cobalt (Co), nickel (Ni), zinc (Zn), aluminum (Al), germanium (Ge), lithium (Li), an alloy thereof, or a combination thereof. The cathode current collector 11 may be omitted.

For example, the cathode active material layer 12 may include a cathode active material.

The cathode active material may be a cathode active material capable of reversibly absorbing and desorbing lithium ions. Examples of the cathode active material may include a lithium transition metal oxide, such as a lithium cobalt oxide (LCO), a lithium nickel oxide, a lithium nickel cobalt oxide, a lithium nickel cobalt aluminum oxide (NCA), a lithium nickel cobalt manganese oxide (NCM), a lithium manganate, a lithium iron phosphate, or a combination thereof; a nickel sulfide; a copper sulfide; a lithium sulfide; an iron oxide; a vanadium oxide; or a combination thereof, but embodiments are not limited thereto, and any material suitable for use a cathode active material may be used. The foregoing examples of the cathode active material may be used alone or in combination, for example, a mixture of at least two selected therefrom.

The lithium transition metal oxide may be, for example, a compound represented by one of the following formulae: $Li_aA_{1-b}B'_bD_2$ (where $0.9 \leq a \leq 1$ and $0 \leq b \leq 0.5$); $Li_aE_{1-b}B'_bO_{2-c}D_c$ (where $0.9 \leq a \leq 1$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.9 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.9 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.9 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where $0.9 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.9 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.9 \leq a \leq 1$, $0 \leq b \leq 0.5$, $0 \leq c \leq 0.05$, and $0 < \alpha < 2$); $Li_aNi_bE_cG_dO_2$ (where $0.9 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.9 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.9 \leq a \leq 1$ and $0.001 \leq b \leq 0.1$); $Li_aCoG_bO_2$ (where $0.9 \leq a \leq 1$ and $0.001 \leq b \leq 0.1$); $Li_aMnG_bO_2$ (where $0.9 \leq a \leq 1$ and $0.001 \leq b \leq 0.1$); $Li_aMn_2G_bO_4$ (where $0.9 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); or $LiFePO_4$. In the above compounds, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The above compounds may have a surface coating layer (hereinafter, also referred to as "coating layer"). Alternatively, a mixture of a compound without a coating layer and a compound having a coating layer may be used, where the compounds are selected from the compounds listed above. In some embodiments, the coating layer may include at least one of an oxide, a hydroxide, an oxyhydroxide, an oxycarbonate, or a hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In some embodiments, the coating layer may be formed using any method that does not adversely affect the physical properties of the cathode active material when a compound of the coating element is used. For example, the coating layer may be formed using a spray coating method or a dipping method. The coating methods are well understood by one of ordinary skill in the art, and thus a detailed description thereof is omitted herein.

The cathode active material may include, for example, a lithium transition metal oxide including a lithium salt of a transition metal oxide that has a layered rock-salt type structure. For example, the term "layered rock-salt type structure" refers to a structure in which an oxygen atom layer and a metal atom layer are alternately and regularly arranged in a <111> direction in a cubic rock-salt type structure, and where each of the atom layers forms a two-dimensional flat plane. The term "cubic rock-salt type structure" refers to a sodium chloride (NaCl) type structure, which is one of the known crystalline structures, in which face-centered cubic (fcc) lattices respectively formed of anions and cations are shifted by only a half of the ridge of each unit lattice. Examples of the lithium transition metal oxide having a layered rock-salt type structure may include a ternary lithium transition metal oxide such as $LiNi_xCo_yAl_zO_2$(NCA) or $LiNi_xCo_yMn_zO_2$ (NCM) (where $0<x<1$, $0<y<1$, $0<z<1$, and $x+y+z=1$). When the cathode active material includes a ternary transition metal oxide having a layered rock-salt type structure, an energy density and thermal stability of the all-solid secondary battery 1 may improve.

The cathode active material may include a coating layer as described above. The coating layer is not limited and may be any suitable material for use as a coating layer of a cathode active material of an all-solid secondary battery. The coating layer may be, for example, $Li_2O$—$ZrO_2$.

When the cathode active material includes nickel (Ni) as a ternary lithium transition metal oxide such as NCA or NCM, a capacity density of the all-solid secondary battery 1 increases, and thus metal elution from the cathode active material in a charged state may be reduced. As a result, the all-solid secondary battery 1 according to an embodiment may have improved cycle characteristics in a charged state.

The cathode active material may have, for example, a particle shape such as a true spherical shape, an elliptical shape, or a semi-spherical shape. A particle diameter of the cathode active material is not particularly limited, but may be in a range suitable for a cathode active material of an all-solid secondary battery. An amount of the cathode active material in the cathode 10 is not particularly limited and may be in a range suitable for a cathode of an all-solid secondary battery.

Additives such as a conducting agent, a binder, a filler, a dispersant, and an ion conducting agent may be included in the cathode 10, in addition to the cathode active material. Examples of the conducting agent may include graphite, carbon black, acetylene black, ketjen black, carbon fiber, a metal powder, or a combination thereof. Examples of the binder may include styrene butadiene rubber (SBR), polytetrafluoroethylene, polyvinylidene fluoride, polyethylene, or a combination thereof. The coating agent, the dispersant, and the ion conducting agent may be appropriately added to the cathode 10, and may be any material that suitable for use in an electrode of an all-solid secondary battery.

The cathode 10 may further include a solid electrolyte. The solid electrolyte in the cathode 10 may be similar to or different from the solid electrolyte in the solid electrolyte 30. Details of the solid electrolyte in the cathode are the same those described with reference to the solid electrolyte 30.

The solid electrolyte in the cathode 10 may be, for example, a sulfide-based (e.g., sulfide-containing) solid electrolyte. The sulfide-based solid electrolyte may also be used as a sulfide-based solid electrolyte in the solid electrolyte 30.

In some embodiments, the cathode 10 may be, for example, impregnated in a liquid electrolyte. The liquid electrolyte may include a lithium salt and at least one of an ionic liquid or a polymer ionic liquid. The liquid electrolyte may be non-volatile. The ionic liquid refers to a salt in a liquid state at room temperature or a room temperature molten salt that has a melting point of room temperature or lower and is only formed of ions. The ionic liquid may be a compound including: a) a cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof, and b) an anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, or a combination thereof. The ionic liquid may be, for example, N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfonyl)imide, 1-ethyl-3-methylimidazolium bis(trifluoromethylsulfonyl)imide, or a combination thereof.

The polymer ionic liquid may have a repeating unit including: a) a cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof; and b) an anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $CF_3SO_2)_2CH^-$, $(SF_5)_3C^-$, $(O(CF_3)_2C_2(CF_3)_2O)_2PO^-$, or a combination thereof. The lithium salt is not limited and may be any suitable lithium salt. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each a natural number), LiCl, LiI, or a combination thereof. A concentration of the lithium salt in the liquid electrolyte may be, for example, in a range of about 0.1 molar (M) to about 5 M, or about 0.05 M to about 4.0 M, or about 0.1 M to about 3.0 M, or about 0.5 M to about 2.0 M, or about 0.5 M to about 1.5 M. An amount of the liquid electrolyte in the cathode 10 may be, for example, in a range of 0 part to about 100 parts by weight, 0 part to about 50 parts by weight, 0 part to about 30 parts by weight, 0 part to about 20 parts by weight, 0 part to about 10 parts by weight, or 0 part to about 50 parts by weight, based on 100 parts by weight of the cathode active material layer 12 not including the liquid electrolyte.

Solid Electrolyte

The solid electrolyte 30 may be disposed between the cathode 10 and the anode 20. The solid electrolyte 30 includes a solid electrolyte. In an aspect, the solid electrolyte 30 may be a solid electrolyte layer.

The solid electrolyte may be, for example, an oxide-based (e.g. oxide-containing) inorganic solid electrolyte. The oxide-based solid electrolyte may include $Li_{1+x+y}Al_xTi_{2-x}Si_yP_{3-y}O_{12}$ (where $0<x<2$ and $0\leq y<3$), $BaTiO_3$, $Pb(Zr_pTi_{1-p})O_3$ (PZT, where $0\leq p\leq 1$), $Pb_{1-x}La_xZr_{1-y}Ti_yO_3$ (PLZT) (where $0\leq x<1$ and $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where $0<x<2$ and $0<y<3$), $Li_xAl_yTi_z(PO_4)_3$ (where $0<x<2$, $0<y<1$, and $0<z<3$), $Li_{1+x+y}(Al_pGa_{1-p})_x(Ti_qGe_{1-q})_{2-x}Si_yP_{3-y}O_{12}$ (where $0\leq x\leq 1$, $0\leq y\leq 1$, $0\leq p\leq 1$, and $0\leq q\leq 1$), $Li_xLa_yTiO_3$ (where $0<x<2$ and $0<y<3$), $Li_2O$, $LiOH$, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (where M is Te, Nb, or Zr, and x is an integer of 1 to 10), or a combination thereof. The solid electrolyte may be prepared using a sintering method.

The oxide-based solid electrolyte may be, for example, a garnet-type solid electrolyte selected from $Li_7La_3Zr_2O_{12}$ (LLZO) and $Li_{3+x}La_3Zr_{2-a}M_aO_{12}$ (M-doped LLZO, where M is Ga, W, Nb, Ta, or Al, and x is an integer of 1 to 10).

In some embodiments, the solid electrolyte may be, for example, a sulfide-based solid electrolyte. The sulfide-based solid electrolyte may include, for example, $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive integers, and Z is Ge, Zn, or Ga), $Li_2S$—$GeS_2$, $Li_2S$—$SiS_2$—$Li_3PO_4$, $Li_2S$—$SiS_2$—$Li_pMO_q$ (where p and q are positive integers, and M is P, Si, Ge, B, Al, Ga, In, or a combination thereof), $Li_7$-$xPS_6$-$xCl_x$(where $0\leq x\leq 2$), $Li_{7-x}PS_{6-x}Br_x$ (where $0\leq x\leq 2$), and $Li_{7-x}PS_{6-x}I_x$ (where $0\leq x\leq 2$). The sulfide-based solid electrolyte material is prepared by melting and quenching the starting materials (e.g., $Li_2S$ or $P_2S_5$), or by mechanical milling of the starting materials. Subsequently, the resultant may be heat-treated. The sulfide-based solid electrolyte may be amorphous, or crystalline, or a mixed form thereof.

The sulfide-based solid electrolyte may include sulfur (S), phosphorus (P), and lithium (Li), as component elements. For example, the sulfide-based solid electrolyte may be a material including $Li_2S$—$P_2S_5$. When the material including $Li_2S$—$P_2S_5$ is used as a sulfide-based solid electrolyte, a mixing molar ratio of $Li_2S$ and $P_2S_5$($Li_2S$:$P_2S_5$) may be, for example, in a range of about 50:50 to about 90:10.

The sulfide-based solid electrolyte may be an argyrodite-type compound including $Li_{7-x}PS_{6-x}Cl_x$ (where $0\leq x\leq 2$), $Li_{7-x}PS_{6-x}Br_x$ (where $0\leq x\leq 2$), $Li_{7-x}PS_{6-x}I_x$ (where $0\leq x\leq 2$), or a combination thereof. In particular, the sulfide-based solid electrolyte may be an argyrodite-type compound including $Li_6PS_5Cl$, $Li_6PS_5Br$, $Li_6PS_5I$, or a combination thereof.

For example, the solid electrolyte 30 may further include a binder. Examples of the binder in the solid electrolyte 30 include styrene butadiene rubber (SBR), polytetrafluoroethylene, polyvinylidene fluoride, polyethylene, or a combination thereof, but is not limited thereto, and any material suitable for use as a binder may be used. The binder of the solid electrolyte 30 may be the same as or different from a binder of the cathode and/or the anode.

Anode

Referring to FIGS. 1 and 2, the anode 20 includes an anode current collector 21, an anode active material layer 22, and a contact layer 23.

During a process of charging the all-solid secondary battery 1, a volume of the anode 20 may increase as shown in FIG. 3. During a process of discharging the all-solid secondary battery 1, a volume of the anode 20 may decrease as shown in FIG. 4.

For example, the anode current collector 21 may be formed of a material that does not react with lithium, that is, a material neither forming an alloy with lithium nor a compound with lithium. Examples of material forming the anode current collector 21 may include copper (Cu), stainless steel, titanium (Ti), iron (Fe), cobalt (Co), nickel (Ni), or a combination thereof, but embodiments are not limited thereto, and any material available suitable for use as an electrode (anode) current collector in the art may be used. The anode current collector 21 may include any one metal alone, an alloy of at least two different metals, or a coating material. The anode current collector 21 may be, for example, in the form of a plate or a foil.

The anode active material layer 22 may include a first anode active material layer 221 and a second anode active material layer 222.

The first anode active material layer 221 may be disposed on the anode current collector 21 and may include a first metal. The first anode active material layer 221 may thus be a first metal layer. The first metal may include lithium metal or a lithium alloy. Accordingly, since the first anode active material layer 221 is a metal layer including lithium or a lithium alloy, for example, the first anode active material layer 221 may function as a lithium reservoir.

The lithium metal refers to metallic lithium and thus consists of lithium (Li), and does not include a metal alloyable with lithium. The lithium alloy includes lithium and a metal alloyable with lithium. Examples of the lithium alloy may include a Li—Ag alloy, a Li—Au alloy, a Li—Al alloy, a Li—Sn alloy, a Li—In alloy, a Li—Zn alloy, a Li—Ge alloy, a Li—Si alloy, or a combination thereof, but embodiments are not limited thereto, and any material suitable as a lithium alloy may be used. The first anode active material layer 221 may include one of the lithium alloys or lithium metal, or may include a combination of various alloys selected therefrom.

A thickness t1 of the first anode active material layer 221 may be about 10 μm or greater. For example, the thickness t1 of the first anode active material layer 221 may be in a range of about 10 μm to about 1,000 μm, about 10 μm to about 500 μm, about 10 μm to about 200 μm, about 10 μm to about 150 μm, about 10 μm to about 100 μm, or about 10 μm to about 50 μm. When the thickness t1 of the first anode active material layer 221 is too thin, the first anode active material layer 221 may not function as a lithium reservoir. When the thickness t1 of the first anode active material layer 221 is too thick, a weight and a volume of the all-solid secondary battery 1 increases, and cycle characteristics of the all-solid secondary battery 1 may be deteriorated.

The first anode active material layer 221 may be disposed between the anode current collector 21 and the second anode active material layer 222. When the all-solid secondary battery 1 is charged, lithium is deposited in the first anode active material layer 221, and a volume or a thickness of the first anode active material layer 221 may increase due to the deposited lithium.

A volume of the first anode active material layer 221 after charge may be about 150% to about 5,000% of a volume of the first anode active material layer 221 after discharge. A thickness of the first anode active material layer 221 after charge may be about 150 to about 5,000% of a thickness of the first anode active material layer 221 after discharge.

In a charging/discharging process (e.g., a charge/discharge cycle), a volume change rate (e.g., a percent volume change) of the first anode active material layer 221 may be greater than a volume change rate of the contact layer 23. In the charging/discharging process, a volume change rate of the first anode active material layer 221 may be greater than a volume change rate of the second anode active material layer 222. In the charging/discharging process, a thickness change rate of the first anode active material layer 221 may be greater than a thickness change rate of the contact layer 23. In the charging/discharging process, a thickness change rate of the first anode active material layer 221 may be greater than a thickness change rate of the second anode active material layer 222.

The second anode active material layer 222 may be disposed between the first anode active material layer 221 and the solid electrolyte 30 and may include a carbon-based (e.g., carbon-containing) active material.

The carbon-based active material may include amorphous carbon. Examples of the amorphous carbon may include carbon black (CB), acetylene black (AB), furnace black (FB), furnace black (FB), ketjen black (KB), graphene, carbon nanotubes, carbon nanofibers, or a combination thereof, but is not limited thereto, and any material classified as an amorphous carbon may be used.

The second anode active material layer 222 may include a metal or a metalloid as an anode active material. As used herein, "metalloid" means B, Si, Ge, As, Sb, Te, or a combination thereof.

The metal or metalloid anode active material may include indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), zinc (Zn), or a combination thereof, but is not limited thereto, and any metal anode active material or metalloid anode active material capable of forming an alloy or a compound with lithium may be used.

The second anode active material layer 222 may include an anode active material including a carbon-based active material, a metal or a metalloid anode active material, or a combination of the carbon-based active material and the metal or metalloid active material. For example, the second anode active material layer 222 may include only amorphous carbon, or the second anode active material layer may include indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), zinc (Zn), or a combination thereof. In some embodiments, the second anode active material 222 may include a composite of amorphous carbon and a metal or a metalloid including indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), zinc (Zn), or a combination thereof. A composite ratio of a composite of amorphous carbon and a metal (e.g., silver) or metalloid is a weight ratio, which may be, for example, in a range of about 10:1 to about 1:2, about 5:1 to about 1:1, or about 4:1 to about 2:1, but embodiments are not limited thereto, and the composite ratio may be determined by the person of skill in the art according to the desired characteristics of the all-solid secondary battery 1. When the second anode active material layer 222 has this composition, cycle characteristics of the all-solid secondary battery 1 may improve.

The anode active material in the second anode active material layer 222 may include, for example, a mixture of first particles of an amorphous carbon and second particles of a metal or a metalloid. The mixture may comprise, consist of, or consist essentially of a dispersion of the first particle and the second particle. Alternatively, the mixture may further include a binder and the first particle and the second particles may be physically bound together by the binder. For example, the metal or metalloid may include indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), zinc (Zn), or a combination thereof. In some embodiments, the metal or metalloid may be a semiconductor. An amount of the second particles may be in a range of about 8 weight % (wt %) to about 60 wt %, about 10 wt % to about 50 wt %, about 15 wt % to about 40 wt %, or about 20 wt % to about 30 wt %, based on the total weight of the mixture. When the amount of the second particles is within these ranges, for example, cycle characteristics of the all-solid secondary battery 1 may improve.

A thickness t2 of the second anode active material layer 222 may be, for example, in a range of about 10 nm to about 10 μm, about 100 nm to about 10 μm, about 200 nm to about 10 μm, about 300 nm to about 10 μm, about 400 nm to about 10 μm, about 500 nm to about 10 μm, about 1 μm to about 10 μm, about 1 μm to about 8 μm, about 2 μm to about 7 μm, or about 3 μm to about 7 μm. When the thickness of the second anode active material layer 222 is within these ranges, a short-circuit in the all-solid secondary battery 1 may be suppressed, and cycle characteristics of the all-solid secondary battery 1 may improve.

The thickness t2 of the second anode active material layer 222 may be less than the thickness t1 of the first anode active material layer 221. The thickness t2 of the second anode active material layer 222 may be less than ½ of the thickness t1 of the first anode active material layer 221. The thickness t2 of the second anode active material layer 222 may be less than 20% of the thickness t1 of the first anode active material layer 221. In an aspect, the thickness t2 may be about 50% to about 1%, about 40% to about 2%, or about 30% to about 4% of the thickness t1.

When the second anode active material layer 222 includes a carbon-based active material, the volume of the second anode active material layer 222 may change according to a volume change of the first anode active material layer 221. For example, when the first anode active material layer 221 expands during a charging process, the second anode active material layer 222 may absorb and alleviate the volume expansion of the first anode active material.

The second anode active material layer 222 includes a carbon-based active material and thus may include a void (pore) therein. The second anode active material layer 222 after discharge may include a void generated therein. During a charging process, lithium fills the void of the second anode active material layer 222, and in this regard, the volume expansion of the first anode active material layer 221 may be alleviated. As the volume expansion of the first anode active material layer 221 is alleviated, a pressure applied by the anode 20 on the solid electrolyte 30 is reduced, and thus a short-circuit of the solid electrolyte 30 may be delayed.

A volume of the second anode active material layer 222 after charging may be greater than a volume of the second anode active material layer 222 after discharging. The volume of the second anode active material layer 222 after charging may be about 2 times or less the volume of the second anode active material layer 222 after discharging. A thickness t21 of the second anode active material layer 222 after charging may be greater than a thickness t22 of the second anode active material layer 222 after discharging. The thickness t21 of the second anode active material layer 222 after charging may be about 2 times or less than the thickness t22 of the second anode active material layer 222 after discharging. In other words, the volume and/or thickness of the second anode active material layer after charge does not increase more than 2 fold relative to the volume and/or thickness of the second anode active material layer during discharge.

When the second anode active material layer 222 includes a carbon-based active material as described above, volume expansion of the first anode active material layer 221 may be alleviated, whereas an interface adhesive strength with the solid electrolyte may be deteriorated. Accordingly, when the second anode active material layer 222 is disposed such that the second anode active material layer 222 directly contacts the solid electrolyte 30, an interfacial resistance between the anode 20 and the solid electrolyte 30 may increase.

In this regard, the anode 20 of the all-solid secondary battery 1 according to an embodiment includes the contact layer 23 disposed between the second anode active material layer 222 and the solid electrolyte 30.

At least a portion of the contact layer 23 is disposed between the second anode active material layer 222 and the solid electrolyte 30 and directly contacts the solid electrolyte 30. As the contact layer 23 directly contacts the solid electrolyte 30, the second anode active material layer 222 may be prevented from directly contacting the solid electrolyte 30. Thus the contact layer is between the second anode active material layer and the solid electrolyte, and is disposed such that the contact layer prevents contact between the second anode active material layer and the solid electrolyte. Accordingly, the contact layer 23 may improve an interface adhesive strength between the anode 20 and the solid electrolyte 30.

An interfacial resistance between the contact layer 23 and the solid electrolyte 30 may be a prescribed level or less. For example, an interfacial resistance between the contact layer 23 and the solid electrolyte 30 may be about 500 ohm cm$^2$ or less, or about 400 ohm cm$^2$ or less, or about 300 ohm cm$^2$ or less. For example, an interfacial resistance between the contact layer 23 and the solid electrolyte 30 may be about 200 ohm cm$^2$ or less.

An interfacial resistance between the contact layer 23 and the solid electrolyte 30 may be lower than an interfacial resistance between the second anode active material layer 222 and the solid electrolyte 30. For example, an interfacial resistance between the contact layer 23 and the solid electrolyte 30 may be less than 10% ($\frac{1}{10}$) of an interfacial resistance between the second anode active material layer 222 and the solid electrolyte 30. For example, when an interfacial resistance between the second anode active material layer 222 and the solid electrolyte 30 directly contacting each other is greater than about 2,000 ohm cm$^2$, an interfacial resistance between the contact layer 23 and the solid electrolyte 30 directly contacting each other may be about 200 ohm cm$^2$ or less.

For example, the contact layer 23 may include a second metal. The contact layer may be a second metal layer. The second metal may include lithium metal, a lithium alloy, a metal alloyable with lithium, or a combination thereof.

The second metal may include lithium metal.

Examples of the lithium alloy may include a Li—Al alloy, a Li—Sn alloy, a Li—In alloy, a Li—Ag alloy, a Li—Au alloy, a Li—Zn alloy, a Li—Ge alloy, a Li—Si alloy, or a combination thereof, but embodiments are not limited thereto, and any material suitable as a lithium alloy may be used.

The metal alloyable with lithium may be, for example, aluminum (Al), tin (Sn), indium (In), silver (Ag), gold (Au), zinc (Zn), germanium (Ge), or silicon (Si), and is not limited thereto, and may be any suitable metal alloyable with lithium that is used in the art.

The contact layer 23 may include the lithium alloy, lithium metal, or a combination thereof. The contact layer 23 may include lithium metal, Li—Al alloy, Li—Sn alloy, Li—In alloy, Li—Ag alloy, Li—Au alloy, Li—Zn alloy, Li—Ge alloy, Li—Si alloy, aluminum (Al), tin (Sn), indium (In), silver (Ag), gold (Au), zinc (Zn), germanium (Ge), silicon (Si), or a combination thereof.

When in a charged state, the contact layer 23 may include lithium metal or lithium alloy. When in a discharged state, the contact layer 23 may include lithium metal or lithium alloy. As another example, when in a discharged state, the contact layer 23 may include metal alloyable with lithium and may not include lithium metal or lithium alloy. Before being charged for the first time, the contact layer 23 may include metal alloyable with lithium and may not include lithium metal or lithium alloy. The second metal may be the same material as the first metal. However, a material of the second metal is not limited thereto, and may be different from a material of the first metal.

For example, the contact layer 23 may not include a carbon-based material. For example, the contact layer 23 may not include a carbon-based material such as a carbon-based active material, e.g., graphite or carbon black, or a carbon-based conducting material, e.g., carbon nanofibers. The contact layer 23 may not include an organic material such as a binder. The contact layer 23 may include, for example, a metal layer formed of a metal, a metalloid, an alloy thereof, or a combination thereof. Since the contact layer 23 is a metal layer and does not include a carbon-based material, a side reaction between a carbon-based material and/or an organic material in a charge/discharge process (cycle) may be prevented.

Also, since the contact layer 23 includes the second metal layer and does not include a carbon-based material, the contact layer 23 may form an interface having an excellent adhesive strength to the solid electrolyte 30 compared to that of the second anode active material layer 222 including a carbon-based active material.

Since the contact layer 23 includes the second metal, the contact layer 23 induces fast dispersion of the lithium ions input through the solid electrolyte 30 in the charging process. Accordingly, a surface of the solid electrolyte 30 is irregular, and thus even when the lithium ions are input to solid electrolyte while being locally focused by the contact layer, the lithium ions may be evenly dispersed throughout the whole anode 20 by using a fast diffusion phenomenon via the contact layer 23.

In the charging process, the contact layer 23 may be configured such that an amount of the metal, e.g., lithium metal or a lithium alloy, deposited during formation of the contact layer is less than an amount of the first metal in the first anode active material layer 221.

A thickness t3 of the contact layer 23 may be a predetermined thickness or less. For example, the thickness t3 of the contact layer 23 may be about 1 μm or less. For example, the thickness t3 of the contact layer 23 may be about 700 nm or less. For example, the thickness t3 of the contact layer 23 may be about 500 nm or less. For example, the thickness t3 of the contact layer 23 may be about 300 nm or less. For example, the thickness t3 of the contact layer 23 may be about 200 nm or less. For example, the thickness t3 of the contact layer 23 may be about 100 nm or less. For example, the thickness t3 of the contact layer 23 may be about 70 nm or less. For example, the thickness t3 of the contact layer 23 may be about 50 nm or less.

However, when the thickness t3 of the contact layer 23 is too thin, the original purpose for the second anode active material layer 222 to directly contact the solid electrolyte 30 may not be achieved, and thus the thickness t3 of the contact layer 23 may be about 1 nm or greater. For example, the thickness t3 of the contact layer 23 may be 30 nm or greater. In an aspect, the thickness t3 of the contact layer 23 may be about 1 nm or greater, about 5 nm or greater, about 10 nm or greater, about 20 nm or greater, or about 30 nm or greater. The thickness of the contact layer may thus be about 1 nm to about 1 μm, about 1 nm to about 700 nm, about 1 nm to about 500 nm, about 1 nm to about 300 nm, about 1 nm to about 200 nm, about 1 nm to about 100 nm, about 1 nm to about 70 nm, or about 1 nm to about 50 nm. The thickness of the contact layer may be uniform or may not be uniform. Here, when the thickness t3 of the contact layer 23 is not uniform, the thickness t3 of the contact layer 23 is defined as an average thickness of the contact layer 23.

The thickness t3 of the contact layer 23 is less than the thickness t1 of the first anode active material layer 221. For example, the thickness t32 of the contact layer 23 after discharge may be less than the thickness t12 of the first anode active material layer 221 after discharge. For example, when the thickness t12 of the first anode active material layer 221 after discharge is greater than about 10 μm, a thickness t32 of the contact layer 23 after discharging may be about 1 μm or less. For example, the thickness t32 of the contact layer 23 after discharge may be about 700 nm or less. For example, the thickness t32 of the contact layer 23 after discharge may be about 500 nm or less. For example, the thickness t32 of the contact layer 23 after discharge may be about 300 nm or less. For example, the thickness t32 of the contact layer 23 after discharge may be about 200 nm or less. For example, the thickness t32 of the contact layer 23 after discharge may be about 100 nm or less. For example, the thickness t32 of the contact layer 23 after discharge may be about 70 nm or less. For example, the thickness t32 of the contact layer 23 after discharge may be about 50 nm or less. However, for example, the thickness t32 of the contact layer 23 after discharge may be about 30 nm or greater. For example, the thickness t32 of the contact layer 23 may be about 30 nm to about 1 μm, about 30 nm to about 700 nm, about 30 nm to 500 nm, about 30 nm to about 300 nm, about 30 nm to about 200 nm, about 30 nm to 100 nm, about 30 nm to about 70 nm, or about 30 nm to about 50 nm.

The thickness t3 of the contact layer 23 may be about 20% (⅕) or less of the thickness t1 of the first anode active material layer 221. The thickness t3 of the contact layer 23 may be about 10% (1/10) or less of the thickness t1 of the first anode active material layer 221. The thickness t3 of the contact layer 23 may be about 5% (1/20) or less of the thickness t1 of the first anode active material layer 221. The thickness t3 of the contact layer 23 may be about 3.33% (1/30) or less of the thickness t1 of the first anode active material layer 221. The thickness t3 of the contact layer 23 may be about 2.5% (1/40) or less of the thickness t1 of the first anode active material layer 221. The thickness t3 of the contact layer 23 may be about 2% (1/50) or less of the thickness t1 of the first anode active material layer 221. The thickness t3 of the contact layer 23 may be about 1% (1/100) or less of the thickness t1 of the first anode active material layer 221. The thickness t3 of the contact layer 23 may be about 0.5% (1/200) or less of the thickness t1 of the first anode active material layer 221. The thickness t3 of the contact layer 23 may be about 0.1% (1/1000) or greater of the thickness t1 of the first anode active material layer 221. For example, the thickness t3 of the contact layer 23 may be about 0.1% to about 10%, about 0.1% to about 5%, about 0.1% to about 3.33%, about 0.1% to about 2.5%, about 0.1% to about 2%, about 0.1% to about 1%, or about 0.1% to about 0.5%, of the thickness t1 of the first anode active material layer 221.

The thickness t32 of the contact layer 23 after discharge may be about 20% (⅕) or less of the thickness t12 of the first anode active material layer 221 after discharge. The thickness t32 of the contact layer 23 after discharge may be about 10% (1/10) or less of the thickness t12 of the first anode active material layer 221 after discharge. The thickness t32 of the contact layer 23 after discharging may be about 5% (1/20) or less of the thickness t12 of the first anode active material layer 221 after discharging. The thickness t32 of the contact layer 23 after discharging may be about 3.33% (1/30) or less of the thickness t12 of the first anode active material layer 221 after discharging. The thickness t32 of the contact layer 23 after discharging may be about 2.5% (1/40) or less of the thickness t12 of the first anode active material layer 221 after discharging. The thickness t32 of the contact layer 23 after discharging may be about 2% (1/50) or less of the thickness t12 of the first anode active material layer 221 after discharging. The thickness t32 of the contact layer 23 after discharging may be about 1% (1/100) or less of the thickness t12 of the first anode active material layer 221 after discharging. The thickness t32 of the contact layer 23 after discharging may be about 0.5% (1/200) or less of the thickness t12 of the first anode active material layer 221 after discharging. The thickness t32 of the contact layer 23 after discharging may be about 0.1% (1/1000) or greater of the thickness t12 of the first anode active material layer 221 after discharging. For example, the thickness t32 of the contact layer 23 after discharge may be about 0.1% to about 20%, about 0.1% to about 10%, about 0.1% to about 5%, about 0.1% to about 3.33%, about 0.1% to about 2.5%, about 0.1% to about 2%, about 0.1% to about 1%, or about 0.1% to about 0.5%, of the thickness t12 of the first anode active material layer 221 after discharge.

The thickness t31 of the contact layer 23 after charge may be about 10% (1/10) or less of the thickness t11 of the first anode active material layer 221 after charge. The thickness t31 of the contact layer 23 after charge may be about 5% (1/20) or less of the thickness t11 of the first anode active material layer 221 after charge. The thickness t31 of the contact layer 23 after charge may be about 2.5% (1/40) or less of the thickness t11 of the first anode active material layer 221 after charge. The thickness t31 of the contact layer 23 after charging may be about 1.66% (1/60) or less of the thickness t11 of the first anode active material layer 221 after charging. The thickness t31 of the contact layer 23 after charging may be about 1.25% (1/80) or less of the thickness t11 of the first anode active material layer 221 after charging. The thickness t31 of the contact layer 23 after charging may be about 1% (1/100) or less of the thickness t11 of the first anode active material layer 221 after charging. The thickness t31 of the contact layer 23 after charging may be about 0.5% (1/200) or less of the thickness t11 of the first anode active material layer 221 after charging. The thickness t31 of the contact layer 23 after charging may be about 0.25% (1/400) or less of the thickness t11 of the first anode active material layer 221 after charging. The thickness t31 of the contact layer 23 after charging may be about 0.05% (1/2000) or greater of the thickness t11 of the first anode active material layer 221 after charging. For example, the thickness t31 of the contact layer 23 after charge may be about 0.05% to about 10%, about 0.05% to about 5%, about 0.05% to about 2.5%, about 0.05% to about 1.66%, about 0.05% to about 1.25%, about 0.05% to about 1%, about 0.05% to about 0.5%, or about 0.05% to about 0.25%, of the thickness t11 of the first anode active material layer 221 after charge.

Accordingly, by designing the thickness t3 of the contact layer 23 to be a predetermined thickness (or less) and the thickness t1 of the first anode active material layer 221 to be greater than the thickness of the contact layer 23, an amount of the metal deposited as the contact layer 23 during charge of the all-solid secondary battery 1 may be decreased, and the metal may be induced to be deposited in the first anode active material layer 221.

When the thickness t3 of the contact layer 23 is greater than the predetermined thickness, an amount of the lithium metal locally deposited as the contact layer 23 during the charging process may increase. This may generate cracks in the solid electrolyte 30.

In particular, when the solid electrolyte 30 includes an oxide-based solid electrolyte, which has a greater hardness than a sulfide-based solid electrolyte, cracks may be generated in the solid electrolyte 30 due to the localized deposition of the lithium metal in the contact layer 23, and the lithium metal may penetrate the solid electrolyte 30 through the cracks. The penetration of the lithium metal into the solid electrolyte may cause a short circuit which may deteriorate stability of the all-solid secondary battery 1.

Also, due to the lithium metal locally deposited as the contact layer 23, in the repeated charge/discharge process, a void may be formed between the contact layer 23 and the solid electrolyte 30, and a contact area between the contact layer 23 and the solid electrolyte 30 may be reduced, which may lead to overvoltage of the all-solid secondary battery 1.

However, in the all-solid secondary battery 1 according to an embodiment, the metal is also deposited in the first anode active material layer 221, and thus an amount of the lithium metal deposited in the contact layer 23 may be reduced. In this regard, the short circuiting and overcharge of the all-solid secondary battery 1 may be prevented.

When an amount of lithium deposited in the contact layer 23 in the charging process is reduced, a volume change rate of the contact layer 23 in the charge/discharge process may be small.

For example, a volume of the contact layer 23 after charge may be about 150% or less of a volume of the contact layer 23 after discharge. A volume of the contact layer 23 after charge may be about 140% or less of a volume of the contact layer 23 after discharge. A volume of the contact layer 23 after charge may be about 130% or less of a volume of the contact layer 23 after discharge.

For example, in the charge/discharge process, a volume change rate of the contact layer 23 may be less than a volume change rate of the first anode active material layer 221. In the charge/discharge process, a volume change rate of the contact layer 23 may be about 70% or less of a volume change rate of the first anode active material layer 221. In the charge/discharge process, a volume change rate of the contact layer 23 may be about 60% or less of a volume change rate of the first anode active material layer 221. A volume change rate of the contact layer may be about 5% to about 70% of a volume change rate of the first anode active material layer, or a volume change rate of the contact layer may be about 10% to about 60% of a volume change rate of the first anode active material layer, or a volume change rate of the contact layer may be about 10% to about 50% of a volume change rate of the first anode active material layer. The second metal of the contact layer 23 may be the same as the first metal of the first anode active material layer 221. For example, the second metal and the first metal may both be lithium metal. For example, the second metal and the first metal may both be a lithium alloy, and the metal forming an alloy with lithium may be the same.

However, the second metal is not necessarily the same as the first metal layer, and the material may vary according to the preparation method or desired used.

Figure 5A:
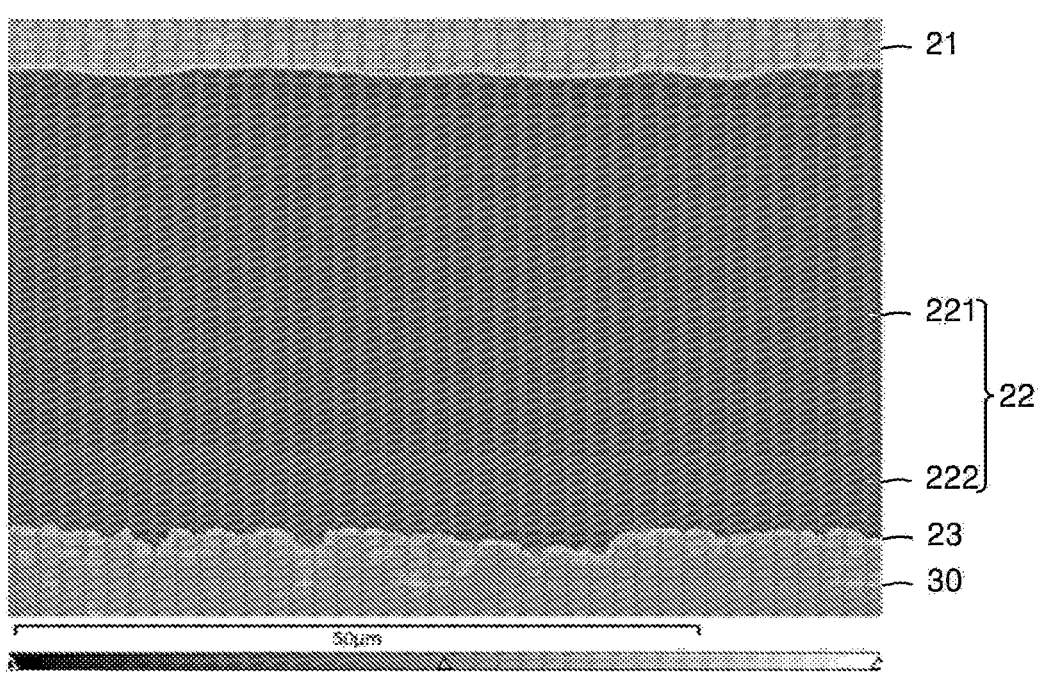
FIG. 5A is a scanning electron microscope (SEM) image of a cross-section of an exemplary embodiment of an anode after charge.
Figure 5B:
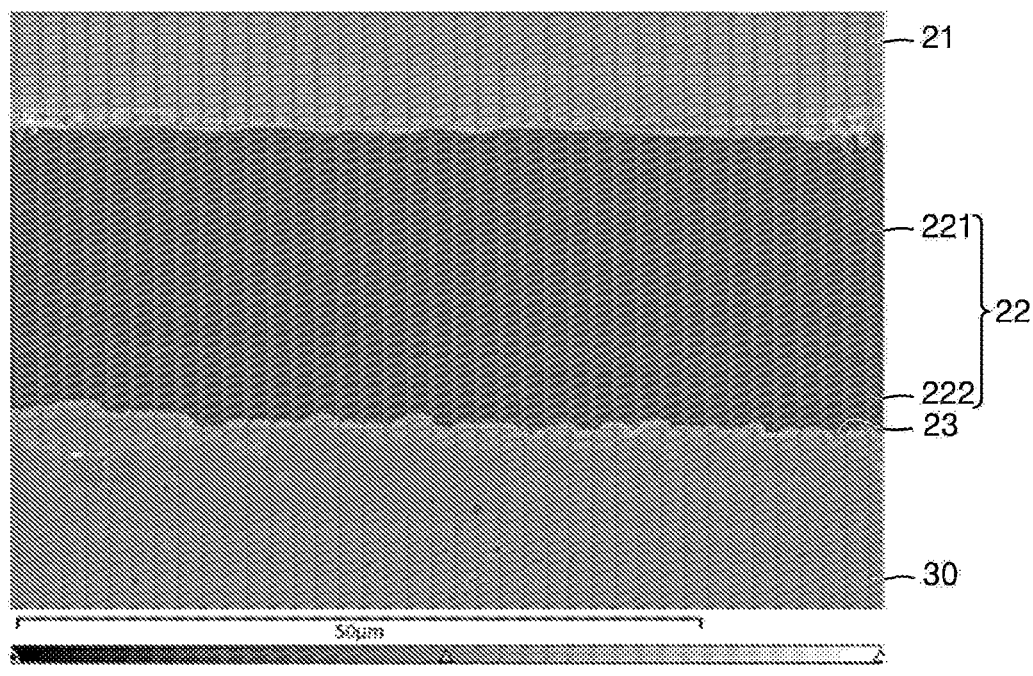
FIG. 5B is an SEM image of a cross-section of an exemplary embodiment of the anode after discharge.
Figure 6A:
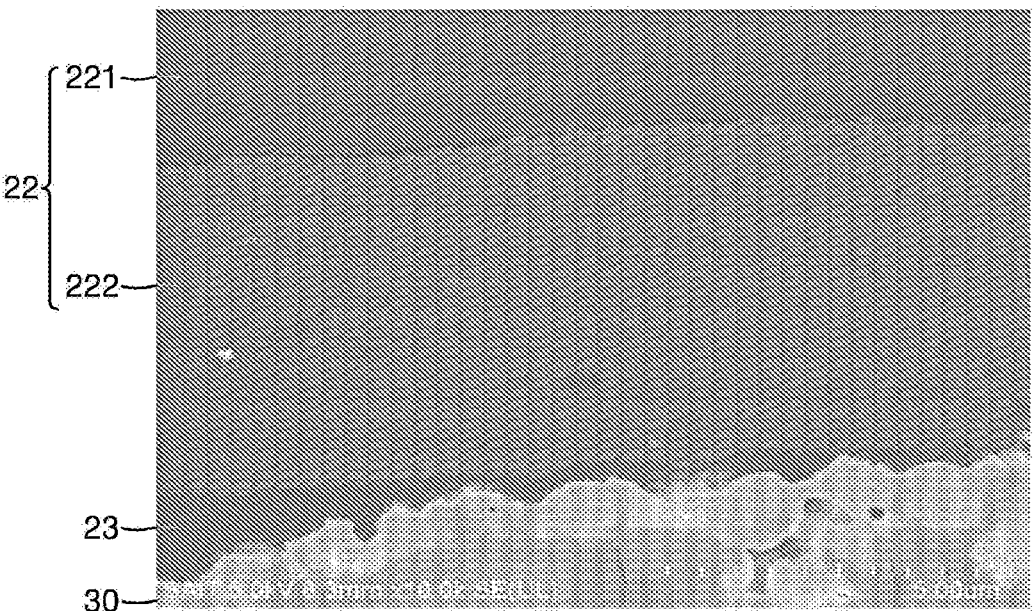
FIG. 6A is an enlarged view of the SEM image of FIG. 5A, showing the periphery of the contact layer and the second anode active material layer.
Figure 6B:
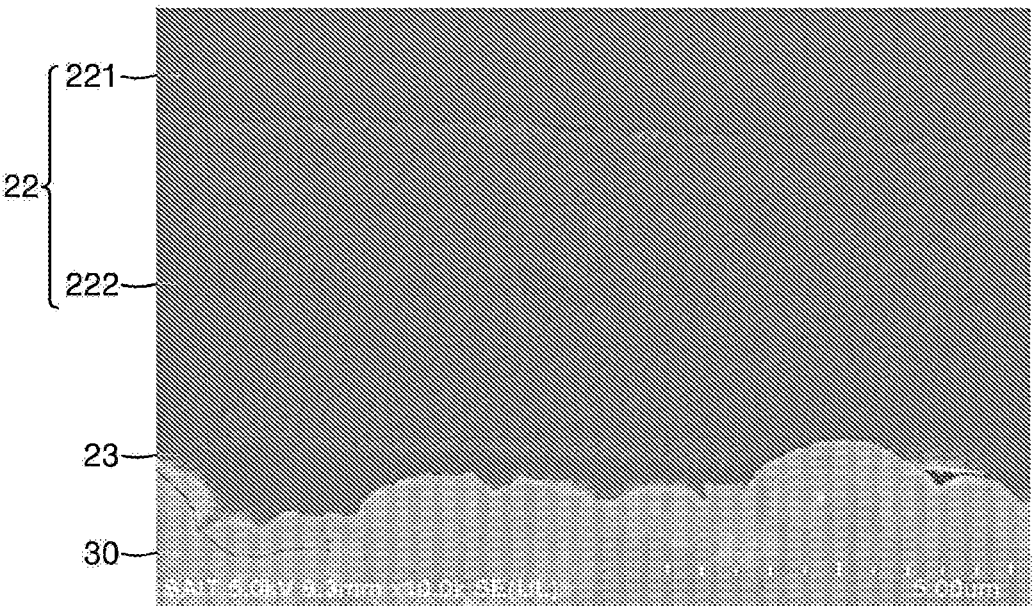
FIG. 6B is an enlarged view the SEM image of FIG. 5B, showing the periphery of the contact layer and the second anode active material layer.

FIGS. 5A and 5B are, respectively, a cross-section scanning electron microscope (SEM) image after charge and a cross-section SEM image after discharge of an exemplary embodiment of the anode 20. FIGS. 6A and 6B are, respectively, an enlarged cross-section SEM image of the periphery of the contact layer 23 and the second anode active material layer 222 in FIG. 5A and an enlarged cross-section SEM image of the periphery of the contact layer 23 and the second anode active material layer 222 in FIG. 5B.

Referring to FIGS. 5A and 5B, a thickness t11 of the first anode active material layer 221 after charge is in a range of about 32 μm to about 34 μm, and a thickness t12 of the first anode active material layer 221 after discharge is in a range of about 17 μm to about 18 μm.

On the other hand, referring to FIGS. 6A and 6B, a thickness t21 of the second anode active material layer 222 after charge is in a range of about 5 μm to about 6 μm, and a thickness t22 of the second anode active material layer 222 after discharge is also in a range of about 5 μm to about 6 μm. Also, a thickness t31 of the contact layer 23 after charge is in a range of about 0.5 μm to about 1.5 μm, and a thickness t32 of the contact layer 23 after discharge is also in a range of about 0.5 μm to about 1.5 μm.

In this regard, it may be confirmed that for the anode 20 according to an embodiment, a thickness change rate of the contact layer 23 and a thickness change rate of the second anode active material layer 222 are each less than a thickness change rate of the first anode active material layer 221.

A method of preparing the all-solid secondary battery 1 according to an embodiment includes providing an anode 20; disposing the anode 20 on a surface of a solid electrolyte 30; and disposing a cathode 10 on another surface of the solid electrolyte 30.

(Anode Manufacturing Method 1)

FIGS. 7A to 7D are illustrations of an exemplary embodiment of a method of preparing the anode 20.

Figure 7A:
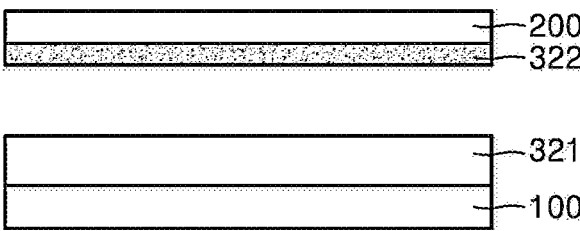
FIGS. 7A to 7D are views illustrating an exemplary embodiment of a method of preparing an anode.

Referring to FIG. 7A, a first layer 321 is formed on a first substrate 100.

The first layer 321 may include a metal layer. The metal layer may include lithium metal, a lithium alloy, or a combination thereof.

The lithium alloy may include a Li—Ag alloy, a Li—Au alloy, a Li—Al alloy, a Li—Sn alloy, a Li—In alloy, a Li—Zn alloy, a Li—Ge alloy, a Li—Si alloy, or a combination thereof, but embodiments are not limited thereto, and any suitable lithium alloy may be used.

The first layer 321 may be formed of a lithium alloy, the lithium metal, or may be formed of a combination of the lithium alloys.

A thickness of the first layer 321 may be in a range of about 1 μm to about 1,000 μm, about 1 μm to about 500 μm, about 1 μm to about 200 μm, about 1 μm to about 150 μm, about 1 μm to about 100 μm, or about 1 μm to about 50 μm.

The first substrate 100 may be formed of a material that does not react with lithium, that is, a material neither forming an alloy with lithium nor a compound with lithium. Examples of the material forming the first substrate 100 may include copper (Cu), stainless steel, titanium (Ti), iron (Fe), cobalt (Co), nickel (Ni), an alloy thereof, or a combination thereof, but embodiments are not limited thereto, and any material capable of functioning as an electrode current collector may be used. The first substrate 100 may be formed of a single metal selected therefrom alone, or may be formed of an alloy of at least two different metals or a coating material. The first substrate 100 may be, for example, in the form of a plate or a foil. The first substrate 100 may be an anode current collector 21.

A second layer 322 is disposed on a second substrate.

The second layer 322 may include a carbon-based active material. The carbon-based active material may include an amorphous carbon. Examples of the amorphous carbon may include carbon black (CB), acetylene black (AB), furnace black (FB), furnace black (FB), ketjen black (KB), graphene, carbon nanotubes, carbon nanofibers, or a combination thereof but embodiments are not limited thereto, and any material classified as amorphous carbon may be used.

The second layer 322 may further include a metal alloyable with lithium. Examples of the metal alloyable with lithium may include silver (Ag), gold (Au), aluminum (Al), tin (Sn), indium (In), zinc (Zn), germanium (Ge), silicon (Si), or a combination thereof, but embodiments are not limited thereto, and any metal alloyable with lithium may be used. In the second layer 322, the metal alloyable with lithium may be omitted.

In terms of forming the second layer 322 on the second substrate, a carbon-based active material, a metal alloyable with lithium, and a binder are mixed to prepare a slurry, and the slurry may be evenly coated and dried on the second substrate 200. The second layer 322 may function as a precursor of the second anode active material layer 222.

The second substrate 200 may be, for example, formed of a material that does not react with lithium, that is, a material neither forming an alloy with lithium nor a compound with lithium. The second substrate 200 may include a material having a predetermined hardness of about 100 megapascals or greater. An example of the material of the second substrate 200 may include stainless steel, but the material of the second substrate 200 is not limited thereto, and a material which does not react with lithium, e.g., copper (Cu), titanium (Ti), iron (Fe), cobalt (Co), nickel (Ni), or combination thereof, may be used. The second substrate 200 may be, for example, in the form of a plate or a foil.

Figure 7B:
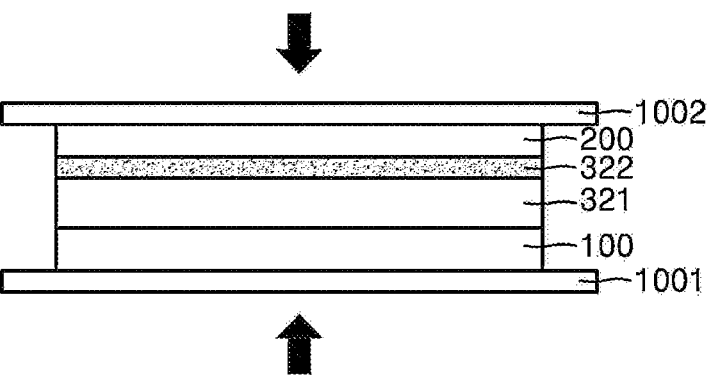

Referring to FIG. 7B, the first layer 321 and the second layer 322 are disposed to face each other, and the first substrate 100 and the second substrate 200 may be pressed together at a predetermined pressure.

For example, the first substrate 100 and the second substrate 200 may be pressed using pressing plates 1001 and 1002. The pressing plates 1001 and 1002 may be formed of a material having a predetermined hardness to facilitate the pressing of the first and second substrates 100 and 200 at a predetermined pressure. For example, a material of the pressing plates 1001 and 1002 may be stainless steel, but the material of the pressing plates 1001 and 1002 is not limited thereto.

As a result of the pressing, the first layer 321 and the second layer 322 move closer to each other and are closely contacted.

Examples of the pressing may include roll pressing, uni-axial pressing, flat pressing, warm isotactic pressing (WIP), or cold isotactic pressing (CIP), but embodiments are not limited thereto, and any suitable pressing method may be used.

A pressure applied during the pressing may be, for example, about 150 MPa or greater. A pressure applied during the pressing may be, for example, about 250 MPa or greater, or about 500 MPa or greater. A pressure applied during the pressing may be, for example, about 1,000 MPa or less. For example, the pressure applied during the pressing may be about 150 MPa to about 1,000 MPa, or about 250 MPa to about 1,000 MPa, or about 250 MPa to about 750 MPa.

A time for the pressing may be about 10 minutes or less, or about 8 minutes or less, or about 5 minutes or less, or about 1 minute or less, or about 30 seconds or less. For example, a time for the pressing may be in a range of about 5 milliseconds (ms) to about 10 minutes (min), or about 1 second to about 7 minutes, or about 30 seconds to about 7 minutes. For example, a time for the pressing may be in a range of about 2 min to about 7 min.

For example, the pressing may be performed at room temperature. For example, the pressing may be performed at a temperature in a range of about 15° C. to about 25° C., but the pressing temperature is not limited thereto, and may be in a range of about 25° C. to about 90° C., or a high temperature of about 100° C. or higher.

Figure 7C:
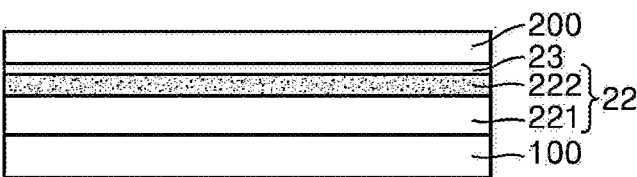

Referring to FIG. 7C, while the first layer 321 and the second layer 322 are pressed at a predetermined pressure, the contact layer 23, which is a third layer including the same metal as the metal in the first layer 321, is formed between the second substrate 200 and the second layer 322. Without being limited by theory, it is understood that the formation of the contact layer 23 occurs as a result of a portion of the first layer 321 moving through the second layer 322.

When the first layer 321 includes lithium metal and the second layer 322 includes a metal alloyable with lithium, the metal included in the second layer 322 may form an alloy layer during the pressing by reacting with lithium in the first layer 321 and the contact layer 23. Accordingly, the first layer 321 may be the first anode active material layer 221 including a lithium alloy, and the contact layer 23 may be a contact layer 23 including a lithium alloy.

When the metal alloyable with lithium is not included in the second layer 322, the first layer 321 may be the first anode active material layer 221 including lithium metal, and the contact layer 23 may be a contact layer 23 including lithium metal.

In the pressing of the first layer 321 and the second layer 322 with a predetermined pressure, a portion of the lithium in the first layer 321 may be injected into the second layer 322. Thus, the second layer 322 may be the second anode active material layer 222 including a carbon-based active material and lithium.

Figure 7D:
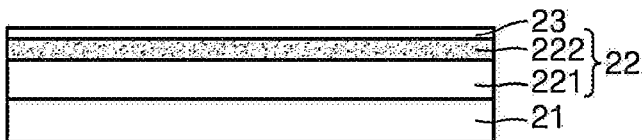

Referring to FIG. 7D, by removing the second substrate 200, the anode 20 is provided in which the first anode active material layer 221, the second anode active material layer 222, and the contact layer 23 are sequentially stacked on the first substrate 100 in this stated order by removing the second substrate 200.

Figure 8:
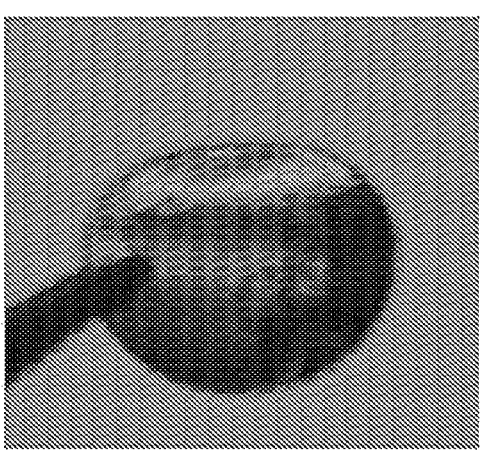
FIG. 8 is an image of an exemplary embodiment of an anode.

FIG. 8 is an image that shows the anode 20 according to an embodiment. Referring to FIG. 8, after the pressing of the first layer 321 and the second layer 322 at a predetermined pressure and the removal of the second substrate 200, it may be confirmed that a surface color of the anode 20 appears to be not black, which is the color of the second anode active material layer 222 including a carbon-based active material. In this regard, it may be confirmed that the contact layer 23 having a relatively bright color is formed on the second anode active material layer 222.

Figure 9:
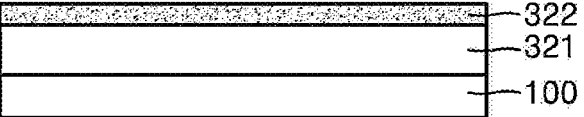
FIG. 9 is a cross-sectional view of an anode of the Comparative Examples.
Figure 10:
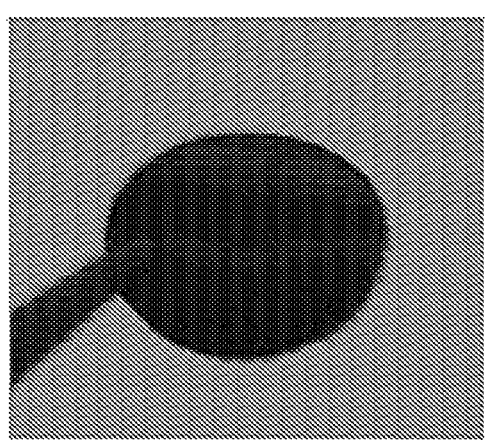
FIG. 10 is an image of the anode of the Comparative Examples.

In the preparing of the anode 20, when the second substrate 200 is removed after pressing the first layer 321 and the second layer 322, for example, with a predetermined pressure of about 150 MPa or less, the anode 20 has a structure in which the first layer 321 and the second layer 322 are attached to each other, as shown in FIG. 9. Accordingly, it may be confirmed that a surface color of the anode 20 appears to be black, as shown in FIG. 10, which is the color of the second anode active material layer 222 including a carbon-based active material.

Figure 11:
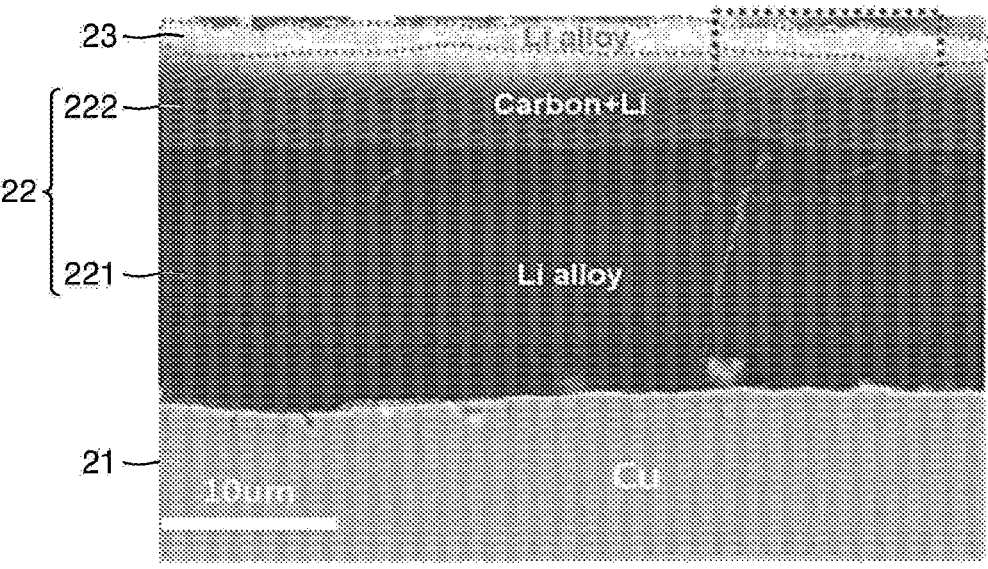
FIG. 11 is a SEM image of a cross-section of an exemplary embodiment of an anode.
Figure 12:
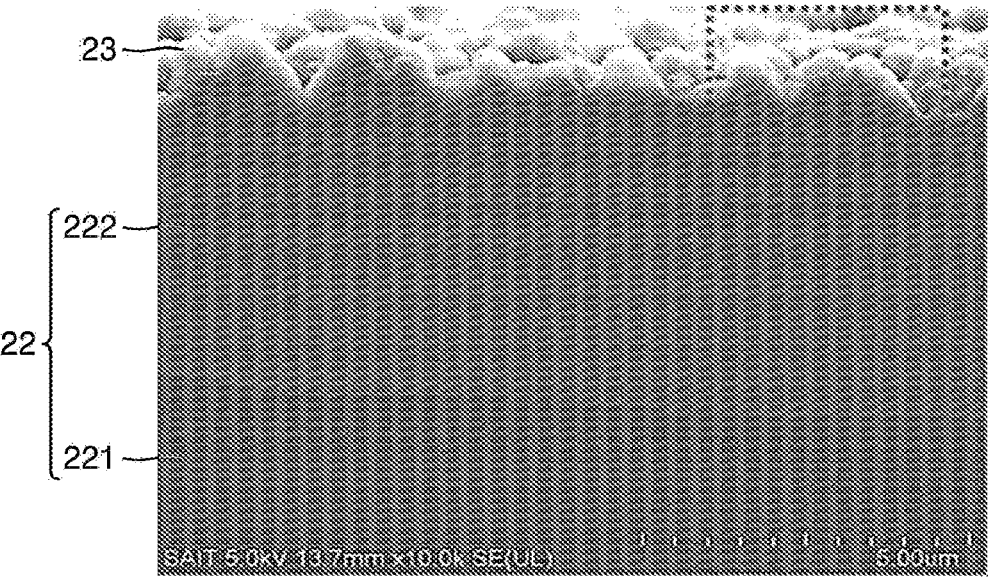
FIG. 12 is an enlarged view of a portion of FIG. 11.
Figure 13:
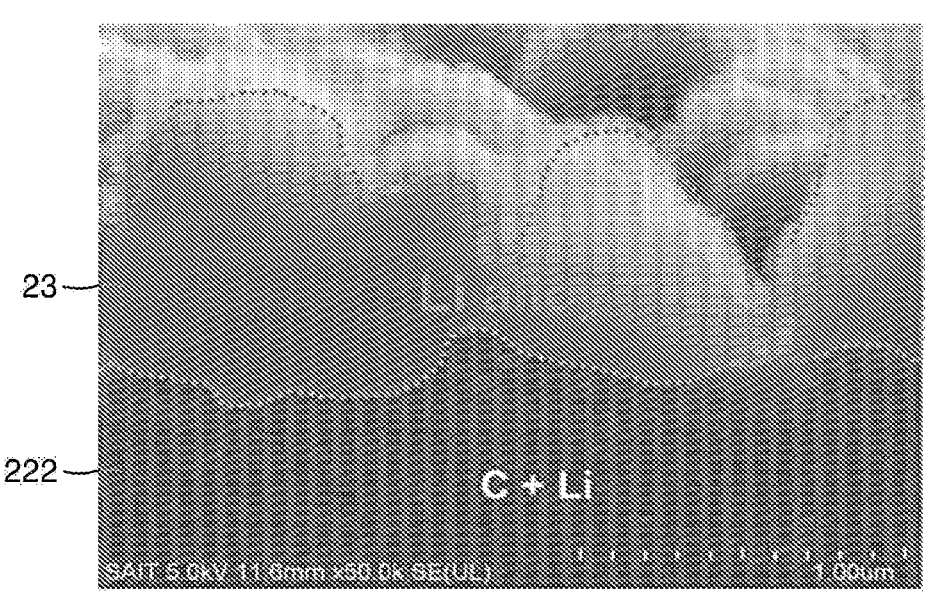
FIG. 13 is an enlarged view of a portion of FIG. 12.

FIGS. 11 to 13 are cross-section SEM images of the anode 20 prepared by using the above-described exemplary method. FIG. 12 is an enlarged view of a portion of FIG. 11, and FIG. 13 is an enlarged view of a portion of FIG. 12.

Referring to FIGS. 11 to 13, it may be confirmed that the contact layer 23 having a thickness less than that of the first anode active material layer 221 is formed on the second anode active material layer 222 by undergoing the preparation method described above.

(Anode Manufacturing Method 2)

FIGS. 14A to 14F are illustrations of an exemplary embodiment of a method of manufacturing the anode 20.

Figure 14A:
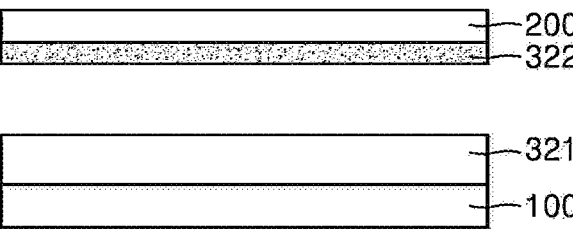
FIGS. 14A to 14F are views illustrating an exemplary embodiment of a method of manufacturing an anode.
Figure 14B:
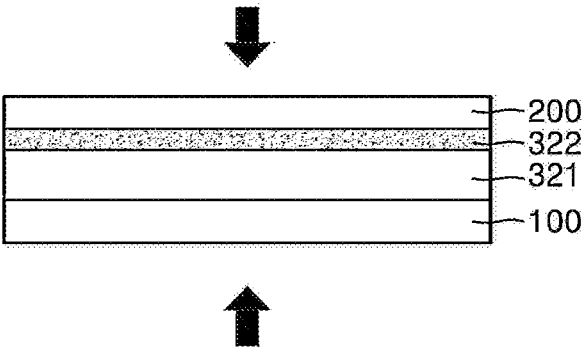
Figure 14C:
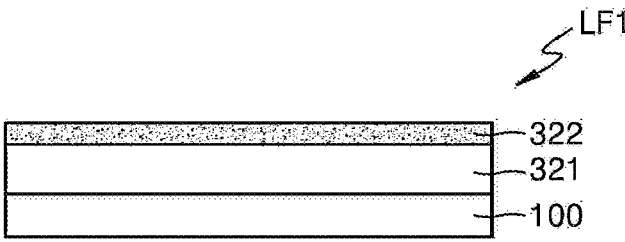

Referring to FIGS. 14A to 14C, the method of manufacturing an anode according to the embodiment may include providing (e.g., preparing) a first stack LF1 in which a first layer 321 and a second layer 322 are stacked on a first substrate 100.

Referring to FIG. 14A, in the preparing the first stack LF1, the first layer 321 disposed on the first substrate 100 and the second layer 322 disposed on the second substrate 200 are prepared.

The first layer 321 may include a metal. The metal may include lithium metal.

A material of the first layer 321 is not limited thereto and may include a lithium alloy. The first layer 321 may include lithium metal or the lithium alloy. Examples of the lithium alloy may include a Li—Ag alloy, a Li—Au alloy, a Li—Al alloy, a Li—Sn alloy, a Li—In alloy, a Li—Zn alloy, a Li—Ge alloy, or a Li—Si alloy, but embodiments are not limited thereto, and any suitable material available as a lithium alloy in the art may be used.

The first layer 321 may comprise one of these alloys or lithium metal, or may comprise various alloys.

A thickness of the first layer 321 may be in a range of about 1 μm to about 1000 μm, about 1 μm to about 500 μm, about 1 μm to about 200 μm, about 1 μm to about 150 μm, about 1 μm to about 100 μm, or about 1 μm to about 50 μm.

The first substrate 100 may comprise a material that does not react with lithium, that is, neither forming an alloy nor a compound with lithium. Examples of the material forming the first substrate 100 may include copper (Cu), stainless steel, titanium (Ti), iron (Fe), cobalt (Co), or nickel (Ni), but embodiments are not limited thereto, and any suitable material available as an electrode current collector may be used.

The first substrate 100 may comprise any metal selected therefrom alone or may comprise an alloy of at least two different metals or a coating material. The first substrate 100 may be, for example, in a form of a plate or a foil. The first substrate 100 may be an anode current collector 21.

The second layer 322 may include a carbon-based active material. Examples of the carbon-based active material may include amorphous carbon. Examples of the amorphous carbon may include carbon black (CB), acetylene black (AB), furnace black (FB), furnace black (FB), ketjen black (KB), graphene, carbon nanotubes, or carbon nanofibers, but embodiment are not limited thereto, and any suitable material classified as amorphous carbon in the art may be used.

The second layer 322 may further include a metal alloyable with lithium. Examples of the metal alloyable with lithium may include silver (Ag), gold (Au), aluminum (Al), tin (Sn), indium (In), zinc (Zn), germanium (Ge), or silicon (Si), but embodiments are not limited thereto, and any suitable material available as a metal alloyable with lithium in the art may be used. In the second layer 322, the metal alloyable with lithium may be omitted.

In terms of forming the second layer 322 on the second substrate, a carbon-based active material, a metal alloyable with lithium, and a binder are mixed to prepare a slurry, the slurry may be evenly coated on the second substrate 200, and the coated second substrate may be dried. The second layer 322 may function as a precursor electrode of the second anode active material layer 222.

The second substrate 200 may be, for example, comprising a material that does not react with lithium, that is, neither forming an alloy nor a compound with lithium. The second substrate 200 may include a material having a predetermined firmness. Examples of the material of the second substrate 200 may include stainless steel, but the material of the second substrate 200 is not limited thereto, and a material not reacting with lithium, e.g., copper (Cu), titanium (Ti), iron (Fe), cobalt (Co), or nickel (Ni) may be used. The second substrate 200 may be, for example, in a form of a plate or a foil.

Since the preparation processes of the first layer 321 and the second layer 322 are the same as described in connection with FIG. 7A, a detailed description thereof will be omitted.

Referring to FIG. 14B, after the first layer 321 and the second layer 322 are disposed to face each other, the first substrate 100 and the second substrate 200 may be pressed such that the first substrate 100 and the second substrate 200 move closer to each other. Although not shown, the first substrate 100 and the second substrate 200 may be pressed by a pressuring plate.

Examples of the pressing may include roll pressing, uni-axial pressing, flat pressing, warm isotactic pressing (WIP), or cold isotactic pressing (CIP), but embodiments are not limited thereto, and any suitable pressing method available in the art may be used.

A pressure applied to the first substrate 100 and the second substrate 200 may be less than a certain level. For example, the pressure applied during pressurization may be less than about 150 MPa. For example, the pressure applied during pressurization may be less than about 100 MPa. For example, the pressure applied during pressurization may be less than about 50 MPa. For example, the pressure applied during pressurization may be less than about 20 MPa. In an aspect, the pressure applied during pressurization may be about 1 MPa to about 150 MPa, about 1 MPa to about 100 MPa, about 1 MPa to about 50 MPa, or about 1 MPa to about 20 MPa.

For example, the pressing may be performed at room temperature. For example, the pressing may be performed at a temperature in a range of about 15° C. to about 25° C., but the pressing temperature is not limited thereto, and may be in a range of about 25° C. to about 90° C., or a high temperature of about 100° C. or higher, for example, about 100° C. to about 200° C., about 100° C. to about 300° C., or about 100° C. to about 400° C.

Due to the pressing, the first layer 321 and the second layer 322 may be assembled while being in a close contact with each other. As the first layer 321 and the second layer 322 are pressed with less than a certain level of pressure, the first layer 321 may be attached to the second layer 322 without forming a separate contact layer 23 between the second substrate 200 and the second layer 322.

Referring to FIG. 14C, the second substrate 200 may be removed from the second layer 322. By removing the second substrate 200, the first stack LF1 in which the first layer 321 and the second layer 322 are stacked on the first substrate 100 may be manufactured.

Figure 14D:
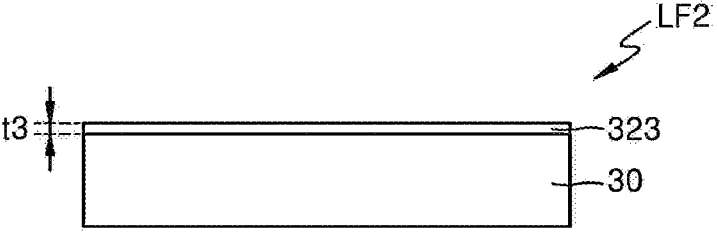

Referring to FIG. 14D, the method of manufacturing the anode according to the embodiment, may include preparing a second stack LF2 including a third layer 323 disposed on the solid electrolyte 30, apart from the first stack LF1.

The third layer 323 may be deposited on the solid electrolyte 30. For example, the third layer 323 which is deposited on the solid electrolyte may be thinner than the first layer 321. The thickness t3 of the third layer 323 deposited on the solid electrolyte 30 may be less than or equal to a predetermined thickness. For example, the thickness t3 of the third layer 323 may be about 1 μm or less. For example, the thickness t3 of the third layer 323 may be about 0.5 μm or less. For example, the thickness t3 of the third layer 323 may be about 0.1 μm or less. The thickness of the third layer 323 may be in the range of about 30 nm to about 100 nm, about 30 nm to about 500 nm, or about 30 nm to about 1 μm.

The deposition temperature of the third layer 323 may be in the range of about 10° C. to about 90° C. The deposition temperature of the third layer 323 may be in the range of about 15° C. to about 50° C. The deposition temperature of the third layer 323 may be in the range of about 20° C. to about 35° C.

The third layer 323 may include a second metal. The second metal may include lithium metal, a lithium alloy, a metal alloyable with lithium, or a combination thereof. The second metal may include lithium metal.

Examples of the lithium alloy may include a Li—Al alloy, a Li—Sn alloy, a Li—In alloy, a Li—Ag alloy, a Li—Au alloy, a Li—Zn alloy, a Li—Ge alloy, or a Li—Si alloy, but embodiments are not limited thereto, and any suitable material available as a lithium alloy in the art may be used.

The metal alloyable with lithium may be, for example, aluminum (Al), tin (Sn), indium (In), silver (Ag), gold (Au), zinc (Zn), germanium (Ge), or silicon (Si), and is not limited thereto, and may be any suitable metal alloyable with lithium that is used in the art.

Since the preparation of the second stack LF2 is performed separately from the preparation of the first stack LF1, the preparation of the second stack LF2 may be performed simultaneously with the preparation of the first stack LF1, or before the preparation of the first stack LF1, or after the preparation of the first stack LF1.

Figure 14E:
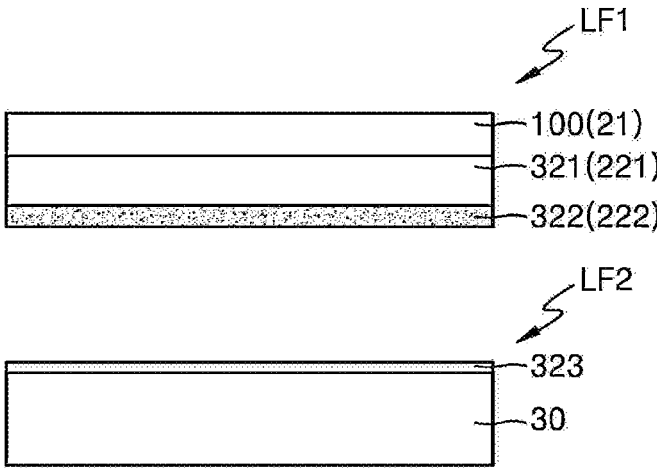

Referring to FIG. 14E, the second layer 322 and the third layer 323 may be disposed to face each other, and pressing may be performed such that the first stack LF1 and the second stack LF2 move closer to each other. Although not shown, the first substrate 100 of the first stack LF1 and the solid electrolyte 30 of the second stack LF2 may be pressed by a pressing plate (not shown).

A pressure applied to the first substrate 100 of the first stack LF1 and the solid electrolyte 30 of second stack LF2 may be equal to or greater than a certain level. For example, the pressure applied during pressing may be 150 MPa or greater. For example, the pressure applied during pressing may be 250 MPa or greater.

The pressure applied to the first substrate 100 of the first stack LF1 and the solid electrolyte 30 of the second stack LF2 is not limited thereto, and may be less than a certain level. For example, the pressure applied during pressing may be less than 250 MPa. For example, the pressure applied during pressing may be less than 150 MPa.

Examples of the pressing may include roll pressing, uni-axial pressing, flat pressing, warm isotactic pressing (WIP), and cold isotactic pressing (CIP), but embodiments are not limited thereto, and any suitable pressing method available in the art may be used.

For example, the pressing may be performed at room temperature. For example, the pressing may be performed at a temperature in a range of about 15° C. to about 25° C., but the pressing temperature is not limited thereto, and may be in a range of about 25° C. to about 90° C., or a high temperature of about 100° C. or greater, for example, 100° C. to about 300° C., about 100° C. to about 500° C., or about 100° C. to about 700° C.

Figure 14F:
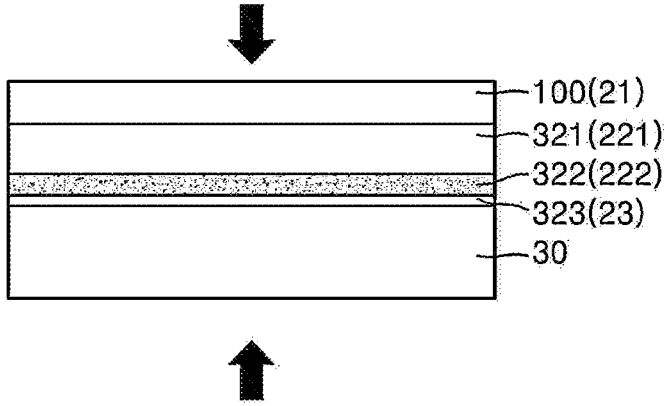

Referring to FIG. 14F, by pressing, the third layer 323 and the second layer 322 may be assembled to be in close contact with each other.

When the third layer 323 and the second layer 322 are pressed with a certain level of pressure, or greater, for example, the pressure of 250 MPa or greater, a portion of the first layer 321, for example, lithium, may move through the second layer 322. In this case, the third layer 323 may be converted into a layer containing lithium alloy.

Since the certain level of pressure is applied to the first stack LF1 and the second stack LF2, the third layer 323 and the second layer 322 may be attached to each other. Accordingly, an anode in which the contact layer 23, the second anode active material layer 222, the first anode active material layer 221, and the anode current collector 21 may be sequentially stacked on the solid electrolyte 30, can be manufactured.

(Anode Manufacturing Method 3)

FIGS. 15A to 15F are illustrations of an exemplary embodiment of aa method of manufacturing an anode 20.

Figure 15A:
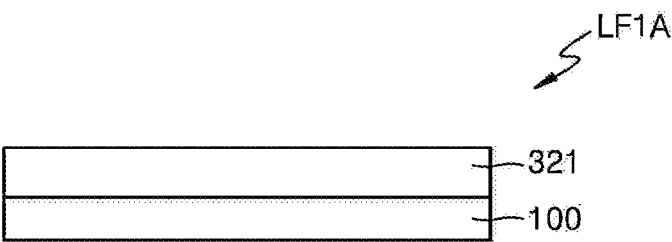
FIGS. 15A to 15F are views illustrating an exemplary embodiment of a method of manufacturing an anode.

Referring to FIG. 15A, the method of manufacturing an anode according to an embodiment may include preparing a first stack LF1A including the first layer 321 disposed on the first substrate 100.

The first layer 321 may include a metal. The metal may include lithium metal.

A material of the first layer 321 is not limited thereto and may include a lithium alloy. The first layer 321 may include lithium metal or the lithium alloy. Examples of the lithium alloy may include a Li—Ag alloy, a Li—Au alloy, a Li—Al alloy, a Li—Sn alloy, a Li—In alloy, a Li—Zn alloy, a Li—Ge alloy, or a Li—Si alloy, but embodiments are not limited thereto, and any suitable material available as a lithium alloy in the art may be used.

The first layer 321 may comprise one of these alloys, lithium metal, or may comprise various alloys.

A thickness of the first layer 321 may be in a range of about 1 μm to about 1000 μm, about 1 μm to about 500 μm, about 1 μm to about 200 μm, about 1 μm to about 150 μm, about 1 μm to about 100 μm, or about 1 μm to about 50 μm.

The first substrate 100 may comprise a material that does not react with lithium, that is, neither forming an alloy nor a compound with lithium. Examples of the material forming the first substrate 100 may include copper (Cu), stainless steel, titanium (Ti), iron (Fe), cobalt (Co), or nickel (Ni), but embodiments are not limited thereto, and any suitable material available as an electrode current collector may be used. The first substrate 100 may comprise any metal selected therefrom alone or may comprise an alloy of at least two different metals or a coating material. The first substrate 100 may be, for example, in a form of a plate or a foil. The first substrate 100 may be an anode current collector 21.

Figure 15B:
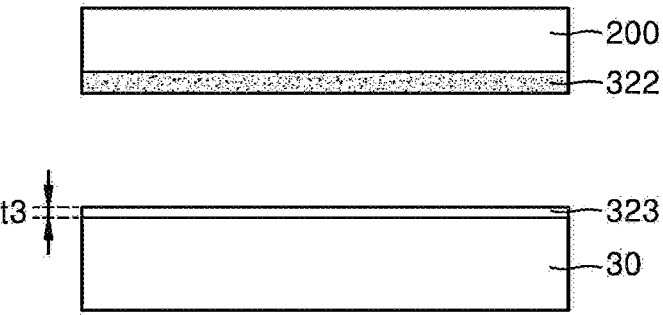
Figure 15C:
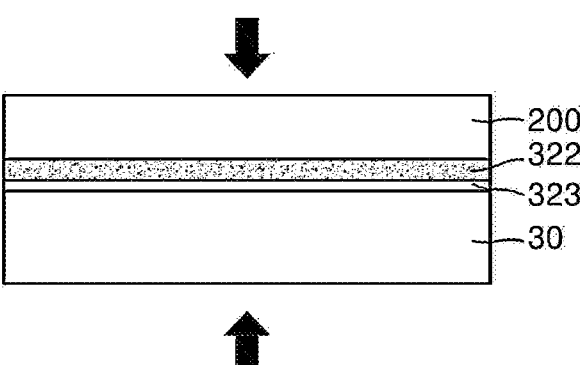
Figure 15D:
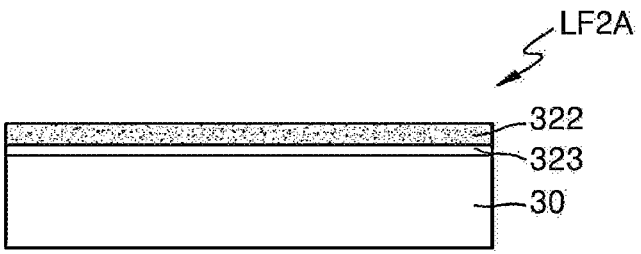

Referring to FIGS. 15B to 15D, the method of manufacturing the anode according to the embodiment may include preparing a second stack LF2A in which the third layer 323 and the second layer 322 are sequentially stacked the solid electrolyte 30, apart from the preparation step of the first stack LF1A.

Referring to FIG. 15B, preparing the second stack LF2A may include preparing a third layer 323 formed on the solid electrolyte 30. For example, the third layer 323 may be formed on the solid electrolyte 30 by deposition.

The third layer 323 may include a second metal. The second metal may include lithium metal, a lithium alloy, a metal alloyable with lithium, or a combination thereof. In an aspect, the second metal is lithium metal.

Examples of the lithium alloy may include a Li—Al alloy, a Li—Sn alloy, a Li—In alloy, a Li—Ag alloy, a Li—Au alloy, a Li—Zn alloy, a Li—Ge alloy, or a Li—Si alloy, but embodiments are not limited thereto, and any suitable material available as a lithium alloy in the art may be used.

The metal alloyable with lithium may be, for example, aluminum (Al), tin (Sn), indium (In), silver (Ag), gold (Au), zinc (Zn), germanium (Ge), or silicon (Si), and is not limited thereto, and may be any suitable metal alloyable with lithium that is used in the art.

The third layer 323 may comprise a lithium alloy lithium metal, or a combination thereof. The third layer 323 may include lithium metal, Li—Al alloy, Li—Sn alloy, Li—In alloy, Li—Ag alloy, Li—Au alloy, Li—Zn alloy, Li—Ge alloy, Li—Si alloy, aluminum (Al), tin (Sn), indium (In), silver (Ag), gold (Au), zinc (Zn), germanium (Ge), silicon (Si), or a combination thereof.

The third layer 323 which is deposited on the solid electrolyte may be thinner than the first layer 321. A thickness t3 of the third layer 323 may be a predetermined thickness or less. For example, the thickness t3 of the third layer 323 may be about 1 μm or less. For example, the thickness t3 of the third layer 323 may be about 0.5 μm or less. For example, the thickness t3 of the third layer 323 may be about 0.1 μm or less. The thickness of the third layer 323 may be in the range of about 30 nm to about 100 nm, about 30 nm to about 500 nm, or about 30 nm to about 1 μm.

The preparing of the second stack LF2A may include preparing the second layer 322 formed on the second substrate 200.

The second layer 322 may include a carbon-based active material. Examples of the carbon-based active material may include amorphous carbon. Examples of the amorphous carbon may include carbon black (CB), acetylene black (AB), furnace black (FB), furnace black (FB), ketjen black (KB), graphene, carbon nanotubes, or carbon nanofibers, but embodiment are not limited thereto, and any suitable material classified as amorphous carbon in the art may be used.

The second layer 322 may further include a metal alloyable with lithium. Examples of the metal alloyable with lithium may include silver (Ag), gold (Au), aluminum (Al), tin (Sn), indium (In), zinc (Zn), germanium (Ge), or silicon (Si), but embodiments are not limited thereto, and any suitable material available as a metal alloyable with lithium in the art may be used. In the second layer 322, the metal alloyable with lithium may be omitted.

In terms of forming the second layer 322 on the second substrate, a carbon-based active material, a metal alloyable with lithium, and a binder are mixed to prepare a slurry, the slurry may be evenly coated on the second substrate 200, and the coated second substrate may be dried. The second layer 322 may function as a precursor electrode of the second anode active material layer 222.

The second substrate 200 may be, for example, comprising a material that does not react with lithium, that is, neither forming an alloy nor a compound with lithium. The second substrate 200 may include a material having a predetermined firmness. Examples of the material of the second substrate 200 may include stainless steel, but the material of the second substrate 200 is not limited thereto, and a material not reacting with lithium, e.g., copper (Cu), titanium (Ti), iron (Fe), cobalt (Co), or nickel (Ni) may be used. The second substrate 200 may be, for example, in a form of a plate or a foil.

Referring to FIG. 15C, the third layer 323 and the second layer 322 may be disposed to face each other, and pressing may be performed such that the solid electrolyte 30 and the second substrate 200 move closer to each other.

The pressure applied to the solid electrolyte 30 and the second substrate 200 may be a certain level or greater. For example, the pressure applied during pressing may be about 150 MPa or greater. For example, the pressure applied during pressing may be about 250 MPa or greater. In an aspect, the pressure applied during pressing may be about 150 MPa to about 750 MPa, about 250 MPa to about 650 MPa, or about 350 MPa to about 550 MPa.

For example, the pressing may be performed at room temperature. For example, the pressing may be performed at a temperature in a range of about 15° C. to about 25° C., but the pressing temperature is not limited thereto, and may be in a range of about 25° C. to about 90° C., or a high temperature of about 100° C. or greater. For example, about 100° C. to about 300° C., about 100° C. to about 500° C., or about 100° C. to about 700° C.

Due to the pressing, the third layer 323 and the second layer 322 may be assembled while being in a close contact with each other.

Referring to FIG. 15D, the second substrate 200 may be removed from the second layer 322. By removing the second substrate 200, a second stack LF2A in which the third layer 323 and the second layer 322 are sequentially stacked on the solid electrolyte 30 may be manufactured.

Figure 15E:
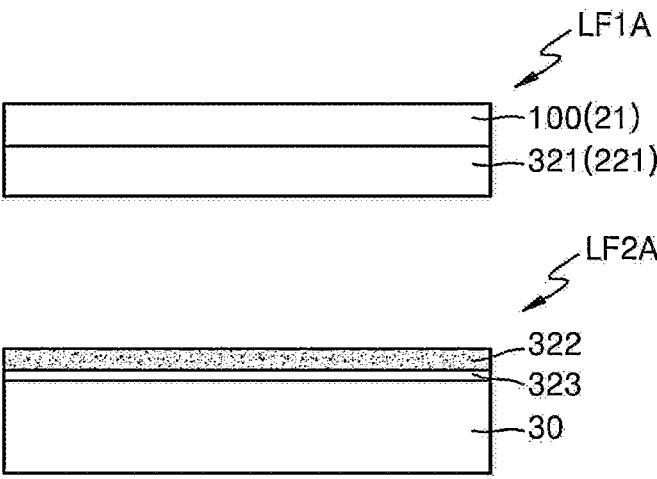
Figure 15F:
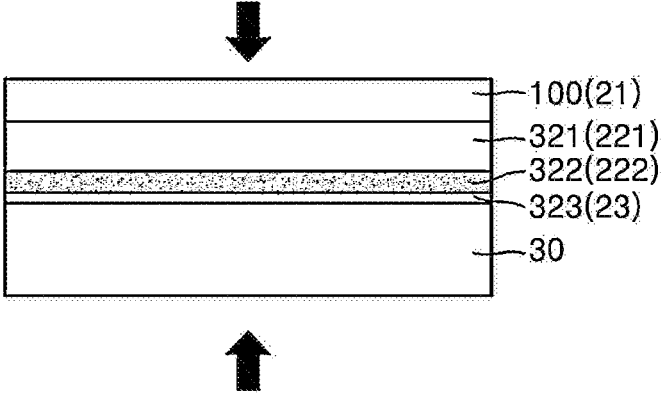

Referring to FIGS. 15E and 15F, pressing may be applied such that, while the second layer 322 and the first layer 321 face each other, the second stack LF2A and the first stack LF1A come close to each other. The first layer 321 and the second layer 322 may be attached by pressing.

The pressure applied to the first stack LF1A and the second stack LF2A may have equal to or greater than a predetermined level of intensity. For example, the pressure applied during pressing may be 150 MPa or greater.

Since the certain level or greater of pressure is applied to the first stack LF1A and the second stack LF2A, a portion of the first layer 321 may pass through the second layer 322 and react with the third layer 323. For example, lithium in the first layer 321 moves through the second layer 322, so that the third layer 323 may include a lithium alloy.

Since the first stack LF1A and the second stack LF2A are pressed, the third layer 323 and the second layer 322 may be attached to each other. Accordingly, an anode in which the contact layer 23, the second anode active material layer 222, the first anode active material layer 221, and the anode current collector 21 may be sequentially stacked on the solid electrolyte 30, can be manufactured.

In an aspect, a solid electrolyte/anode stack subassembly for an all-solid secondary battery, the solid electrolyte/anode stack subassembly comprises: an anode current collector; a first anode active material layer in contact with the anode current collector and comprising a first metal; a second anode active material layer disposed between the first anode active material layer and a solid electrolyte, and comprising a carbon-containing active material; and a contact layer between the second anode active material layer and the solid electrolyte, the contact layer comprising a second metal, and having a thickness less than a thickness of the first anode active material layer, wherein the second metal comprises lithium metal, a lithium alloy, a metal alloyable with lithium, or a combination thereof.

In an aspect, a method of manufacturing the solid electrolyte/anode stack subassembly, the method may comprise providing a first stack comprising a first layer comprising lithium metal or a lithium alloy on a first substrate, and a second layer comprising a carbon-containing active material on the first layer; providing a second stack comprising a third layer disposed on a solid electrolyte, wherein the third layer comprises lithium metal, a lithium alloy, a metal alloyable with lithium, or a combination thereof; and disposing the first stack on the second stack such that the second layer and the third layer face each other, and pressing the first stack and the second stack such that the first stack and the second stack move closer to each other to attach the second layer to the third layer, wherein the third layer is disposed between the second layer and the solid electrolyte, and a thickness of the third layer is less than a thickness of the first layer.

In an aspect, a method of manufacturing the solid electrolyte/anode stack subassembly, the method may comprise providing a first stack comprising a first layer comprising lithium metal or a lithium alloy on a first substrate; providing a second stack comprising a second layer comprising a carbon-containing active material, and a third layer disposed on a solid electrolyte, wherein the third layer comprises lithium metal, a lithium alloy, a metal alloyable with lithium, or a combination thereof; disposing the first stack and the second stack such that the first layer and the second layer face each other; and pressing the first stack and the second stack such that the first stack and the second stack move closer to each other to attach the first layer to the second layer, wherein the third layer is thinner than the first layer.

Preparation of Cathode

The materials constituting a cathode active material layer 12 such as a cathode active material and a binder are added to a non-polar solvent to prepare a slurry. The slurry is coated and dried on a cathode current collector 11. The obtained stack is pressed to prepare a cathode 10. The pressing of the stack may be performed by, for example, roll pressing, flat pressing, or isotactic pressing, but embodiments are not limited thereto, and any pressing method may be used. The pressing of the stack may be omitted. A mixture of the materials constituting the cathode active material layer 12 is compressed into the form of a pellet or stretched (molded) in the form of sheet to prepare the cathode 10. When the cathode 10 is prepared in this manner, the cathode current collector 11 may be omitted. In some embodiments, the cathode 10 may be used by being impregnated with an electrolyte solution.

Preparation of Solid Electrolyte

A solid electrolyte 30 including an oxide-based solid electrolyte may be prepared by heat-treating precursors of the oxide-based solid electrolyte.

The oxide-based solid electrolyte may be prepared by contacting the precursors in stoichiometric amounts, forming a mixture, and then heat-treating the mixture. The contacting may be, for example, performed by milling such as ball milling or pulverization. The mixture of the precursors, mixed in stoichiometric amounts, is primarily heat-treated in an oxidative atmosphere to prepare a primary heat-treatment resultant. The primary heat-treatment may be performed at a temperature less than about 1,000° C. for about 1 hour to about 36 hours. The primary heat-treatment resultant may be pulverized. The pulverizing of the primary heat-treatment may be dry pulverizing or wet pulverizing. For example, the wet pulverizing may be performed by mixing a solvent such as methanol with the primary heat-treatment resultant, and milling the mixture using a ball mill for about 0.5 hours to about 10 hours. The dry pulverizing may be performed by milling the primary heat-treatment resultant using a ball mill without a solvent. A particle diameter of the primary heat-treatment resultant may be in a range of about 0.1 μm to about 10 μm or about 0.1 μm to about 5 μm. The pulverized primary heat-treatment resultant may be dried. The pulverized primary heat-treatment resultant is mixed with a binder solution and molded in the form of a pellet or may be simply pressed at a pressure of about 1 ton to about 10 tons to form a pellet.

The pellet may be subjected to a secondary heat-treatment at a temperature less than about 1,000° C. for about 1 hour to about 36 hours. From the secondary heat-treatment, a solid electrolyte 30 is obtained as a sintered resultant. The secondary heat-treatment may be performed at a temperature, for example, in a range of about 550° C. to about 1,000° C. The secondary heat-treatment may be performed for about 1 hour to about 36 hours. A temperature of the secondary heat-treatment is greater than the temperature of the primary heat-treatment to obtain the sintered resultant. For example, the temperature of the secondary heat-treatment is about 10° C. or greater, about 20° C. or greater, about 30° C. or greater, or about 50° C. or greater than the temperature of the primary heat-treatment. The pellet may be subjected to the secondary heat-treatment in an oxidative atmosphere, a reductive atmosphere, or a combination thereof. The secondary heat-treatment may be performed in a) an oxidative atmosphere, b) a reductive atmosphere, or c) an oxidative atmosphere and a reductive atmosphere.

For example, the solid electrolyte 30 including a sulfide-based solid electrolyte may be prepared by using a solid electrolyte formed of sulfide-based solid electrolyte materials.

The sulfide-based solid electrolyte may be prepared by treating starting materials with a melt quenching method or a mechanical milling method, but embodiments are not limited thereto, and any method of preparing a sulfide-based solid electrolyte available may be used. For example, when the sulfide-based solid electrolyte is prepared by using a melt quenching method, predetermined amounts of the starting materials, e.g., $Li_2S$ and $P_2S_5$, are mixed into a pellet phase, reacted at a predetermined reaction temperature in a vacuum, and quenched to obtain a sulfide-based solid electrolyte. The reaction temperature of the mixture of $Li_2S$ and $P_2S_5$ may be, for example, in a range of about 400° C. to about 1000° C. or about 800° C. to about 900° C. A period of time for the reaction may be in a range of about 0.1 hours to about 12 hours, or, for example, about 1 hour to about 12 hours. A temperature of the quenching may be, for example, about 10° C. or less, or, for example, about 0° C. or less, and a rate of the quenching may be in a range of, for example, 1° C. per second (° C./sec) to about 10,000° C./sec, or, for example, about 1° C./sec to about 1,000° C./sec. For example, when the sulfide-based solid electrolyte is prepared by using a mechanical milling method, predetermined amounts of the starting materials, e.g., $Li_2S$ and $P_2S_5$, are mixed and reacted by using a ball mill to obtain a sulfide-based solid electrolyte. A rate and a period of time of stirring for the mechanical milling method are not particularly limited, but, when the rate of stirring is high, a production rate of the solid electrolyte increases, and, when the period of time of stirring increases, a conversion ratio from the starting materials to the solid electrolyte also increases. Subsequently, the mixture obtained from the melt quenching method or the mechanical milling method is heat-treated at a predetermined temperature, and then the resultant is pulverized to prepare a solid electrolyte in the form of particles. When the solid electrolyte has glass transition characteristics, the solid electrolyte may be changed from amorphous to crystalline by the heat-treatment.

Thus obtained solid electrolyte may be deposited by using a method known to those of skill in the art, for example, an aerosol deposition method, a cold spray method, or a sputtering method, to prepare a solid electrolyte 30. In some embodiments, the solid electrolyte 30 may be prepared by pressing a plurality of the solid electrolyte particles. In some embodiments, the solid electrolyte 30 may be prepared by mixing a solid electrolyte, a solvent, and a binder to prepare a mixture and then coating, drying, and pressing the mixture.

Preparation of all-Solid Secondary Battery

The anode 20 which is prepared by the anode manufacturing method 1 described above, the cathode 10, and the solid electrolyte 30 prepared as described above are stacked in such a way that the cathode 10 and the anode 20 have the solid electrolyte 30 disposed therebetween to prepare a stack, and the stack is pressed to prepare an all-solid secondary battery 1.

For example, the contact layer 23 of the anode 20 is disposed to face a surface of the solid electrolyte 30, and the anode 20 and the solid electrolyte 30 are pressed at a predetermined pressure to attach the anode 20 to the surface of the solid electrolyte 30.

The pressing may be performed by, for example, roll pressing, uni-axial pressing, flat pressing, warm isotactic pressing (WIP), or cold isotactic pressing (CIP), but embodiments are not limited thereto, and any pressure application method may be used. The pressure applied in the pressing may be in a range of about 50 MPa to about 750 MPa, or about 100 MPa to about 700 MPa. A time for the pressing may be in a range of about 5 seconds to about 5 min. The pressing may be performed at a temperature, for example, in a range of room temperature to about 90° C. or about 20° C. to about 90° C. In some embodiments, the pressing is performed at a high temperature of about 100° C. or greater.

Since the anode 20 prepared by the anode manufacturing methods 2 and 3 is attached to the solid electrolyte 30, the attaching of the anode 20 to one side of the solid electrolyte 30 may be omitted.

Next, the cathode 10 is disposed on a surface of the solid electrolyte 30 which is different from (e.g., opposite to) the surface on which the anode 20 is disposed, and the resultant is pressed with a predetermined pressure to attach the cathode 10 to the other surface of the solid electrolyte 30.

The pressing may be performed by, for example, roll pressing, uni-axial pressing, flat pressing, warm isotactic pressing (WIP), or cold isotactic pressing (CIP), but embodiments are not limited thereto, and any pressure available in the art may be used. The pressure applied in the pressing may be in a range of about 50 MPa to about 750 MPa, or about 100 MPa to about 700 MPa. A time for the pressing may be in a range of about 5 seconds to about 5 min. The pressing may be performed at a temperature, for example, in a range of room temperature to about 90° C., or about 20° C. to about 90° C. In some embodiments, the pressing is performed at a high temperature of about 100° C. or greater.

In an aspect, a method of manufacturing an all-solid secondary battery, the method comprises providing a first stack comprising a first layer comprising lithium metal or a lithium alloy on a first substrate, and a second layer comprising a carbon-containing active material on the first layer; providing a second stack comprising a third layer disposed on a solid electrolyte, wherein the third layer comprises lithium metal, a lithium alloy, a metal alloyable with lithium, or a combination thereof; disposing the first stack on the second stack such that the second layer and the third layer face each other, and pressing the first stack and the second stack such that the first stack and the second stack move closer to each other to attach the second layer to the third layer, and providing a cathode on the solid electrolyte opposite the third layer to manufacture the all-solid secondary battery, wherein the third layer is disposed between the second layer and the solid electrolyte, and a thickness of the third layer is be less than a thickness of the first layer.

The providing the first stack may comprise providing the first layer disposed on the first substrate and the second layer disposed on a second substrate, and disposing the first layer and the second layer to face each other, and pressing the first substrate and the second substrate such that the first layer and the second layer move closer to each other.

In the preparing the first stack, the second substrate may be removed from the second layer, and the first substrate may be an anode current collector.

In an aspect, a method of manufacturing an all-solid secondary battery, the method comprises providing a first stack comprising a first layer comprising lithium metal or a lithium alloy on a first substrate; providing a second stack comprising a second layer comprising a carbon-containing active material, and a third layer disposed on a solid electrolyte, wherein the third layer comprises lithium metal, a lithium alloy, a metal alloyable with lithium, or a combination thereof; disposing the first stack and the second stack such that the first layer and the second layer face each other; pressing the first stack and the second stack such that the first stack and the second stack move closer to each other to attach the first layer to the second layer; and providing a cathode on the solid electrolyte opposite the third layer to manufacture the all-solid secondary battery, wherein the third layer is thinner than the first layer.

The providing the second stack may comprise providing the third layer disposed on the solid electrolyte and the second layer disposed on a second substrate, and disposing the third layer and the second layer to face each other, and pressing the second substrate and the solid electrolyte such that the third layer and the second layer move closer to each other.

In the providing the second stack, the second substrate may be removed from the second layer, and the first substrate may be an anode current collector.

A composition and a preparation method of the all-solid secondary battery are examples of embodiments, where elements of the composition and processes of the preparation method may be appropriately modified. The pressing may be omitted.

An embodiment will now be described in more detail with reference to the following examples. However, these examples are not intended to limit the scope of the disclosed embodiment.

EXAMPLES

Example 1 (Anode Comprising a Silver-Lithium Alloy Layer, Silver-Carbon Layer, and Silver-Lithium Alloy Layer (Manufacture of Solid Electrolyte/Anode Stack Subassembly Using Manufacturing Method 1)

Carbon black, as a conducting material and an anode active material, and silver (Ag) nanoparticles alloyable with lithium were mixed with a binder to prepare a slurry, the slurry was evenly coated on a stainless steel foil (a second substrate), and the coated stainless steel foil was dried. As a result, a second precursor electrode (second layer) of the second anode active material layer was manufactured. Separately, a first precursor electrode (lithium metal, first layer) of a first anode active material layer disposed on an anode current collector (first substrate) was prepared.

After placing the second precursor electrode and the first precursor electrode face each other, a pressure of 150 megapascals (MPa) at a temperature of 25° C. was applied to the resultant by cold isotactic pressing (CIP) to attach the precursor electrode to the lithium metal electrode.

In the attaching process, a Li—Ag alloy layer (a contact layer) was formed between the second precursor electrode and the stainless steel foil, and the first precursor electrode reacted with silver (Ag) and was thus changed to a Li—Ag alloy layer (a first anode active material layer).

Then, the stainless steel foil was removed to prepare an anode in which the lithium-silver (Li—Ag) alloy layer having a thickness of about 20 μm, the silver-carbon layer having a thickness of about 5.5 μm, and the lithium-silver (Li—Ag) alloy layer having a thickness of about 0.5 μm were sequentially stacked in this stated order on an anode current collector.

A $Li_{6.5}La_3Zr_{1.5}Ta_{0.5}O_{12}$ (LLZO) pellet having a thickness of about 350 μm was prepared.

The anode was disposed on a surface of the LLZO pellet to face the Li—Ag alloy layer having the thickness of about 0.5 μm, and CIP was applied thereto with a pressure of 250 MPa at 25° C. to attach the anode to the LLZO pellet to prepare a solid electrolyte/anode stack subassembly.
(Preparation of Cathode and all-Solid Secondary Battery)

A cathode and an all-solid secondary battery were prepared in the same manner as in Example 1, except that the solid electrolyte/anode prepared as described above was used.

Example 2 (Anode Comprising a Lithium Layer, Carbon Layer, and Lithium Layer (Manufacture of Solid Electrolyte/Anode Stack Subassembly Using Manufacturing Method 1)

After preparing a slurry by mixing carbon black used as a conductive material and an anode active material with a binder, the slurry was uniformly coated on a stainless steel foil (second substrate), and the coated stainless steel foil was dried. In this manner, a precursor electrode (a second layer) of an anode was prepared. Separately, a lithium metal electrode (a first layer) disposed on an anode current collector (a first substrate) was prepared.

After placing thus prepared precursor electrode and the lithium metal electrode face each other, a pressure of 150 MPa at a temperature of 25° C. was applied to the resultant by cold isotactic pressing (CIP) to attach the precursor electrode to the lithium metal electrode.

In the attaching process, a Li layer (contact layer) was formed between the precursor electrode and the stainless steel foil. Also, the precursor electrode was changed to a carbon layer (a second anode active material layer) including a carbon-based active material and lithium.

Then, the stainless steel was removed to prepare an anode in which the Li layer having a thickness of about 20 μm, the carbon layer having a thickness of about 5.5 μm, and a Li layer having the thickness of about 0.5 μm were sequentially stacked in this stated order on an anode current collector.

A $Li_{6.5}La_3Zr_{1.5}Ta_{0.5}O_{12}$ (LLZO) pellet having a thickness of about 350 μm was prepared.

The anode was disposed on a surface of the LLZO pellet to face the Li layer having the thickness of about 0.5 μm, and CIP was applied thereto with a pressure of 250 MPa at 25° C. to attach the anode to the LLZO pellet (solid electrolyte).
(Preparation of Cathode and all-Solid Secondary Battery)

A cathode and an all-solid secondary battery were prepared in the same manner as in Example 1, except that the solid electrolyte/anode prepared as described above was used.

Example 3 (Anode Comprising a Lithium Layer, Carbon Layer, and Silver (Ag) Layer (Manufacture of Solid Electrolyte/Anode Stack Subassembly Using Manufacturing Method 2)

A $Li_{6.5}La_3Zr_{1.5}Ta_{0.5}O_{12}$ (LLZO) pellet having a thickness of about 350 μm was prepared.

A second stack, a solid electrolyte/contact layer (third layer) assembly, was prepared by depositing silver (Ag) on the solid electrolyte at 25° C. to form a silver (Ag) layer having a thickness of about 30 nm.

Meanwhile, prepared was a stack of a first anode active material layer (first layer)/anode current collector in which a lithium (Li) metal having a thickness of 20 μm was coated on a copper (Cu) foil, which is an anode current collector, having a thickness of 10 μm.

Separately, after preparing a slurry by mixing carbon black, which is used as a conductive material and an anode active material, with a binder, the slurry was uniformly coated on a stainless steel foil having 10 μm (second substrate), and the coated stainless steel foil was dried. As a result, a precursor electrode (second layer) of the second anode active material layer was manufactured.

The second anode active material layer (C)/stainless steel substrate and the first anode active material layer (Li metal)/anode current collector layer were arranged such that the second anode active material layer and the first anode active material layer were in contact with each other, and uni-axial press was applied with a pressure of 10 MPa thereto at 25° C., to prepare a stainless steel substrate/second anode active material layer (carbon)/first anode active material layer (lithium)/current collector stack. Then, the stainless steel substrate attached to the second anode active material layer was removed therefrom, thereby preparing a first stack in which the first anode active material layer (lithium) and the second anode active material layer (carbon) were sequentially stacked on the anode current collector.

The first stack was placed on the second stack such that the contact layer and the second anode active material layer were in contact with each other, and cold isotactic pressing (CIP) was applied thereon with a pressure of 250 MPa at 25° C. to prepare an anode on a solid electrolyte, the anode in which a contact layer (Ag) having a thickness of 30 nm, a second anode active material layer (C) having a thickness of 5 μm, a first anode active material layer (Li) having a thickness of 20 μm, and an anode current collector (Cu) were sequentially stacked.

(Preparation of Cathode and all-Solid Secondary Battery)

A cathode and an all-solid secondary battery were prepared in the same manner as in Example 1, except that the solid electrolyte/anode prepared as described above was used.

Example 4 (Anode Comprising a Lithium Layer, Carbon Layer, and Tin (Sn) Layer (Manufacture of Solid Electrolyte/Anode Stack Subassembly Using Manufacturing Method 3)

A $Li_{6.5}La_3Zr_{1.5}Ta_{0.5}O_{12}$ (LLZO) pellet having a thickness of about 350 μm was prepared.

A solid electrolyte/contact layer assembly was prepared by depositing tin (Sn) on the solid electrolyte at 25° C. to form a Sn layer having a thickness of about 30 nm to about 100 nm.

Separately, after preparing a slurry by mixing carbon black, which is used as a conductive material and an anode active material, with a binder, the slurry was uniformly coated on a stainless steel substrate having 10 μm (second substrate), and the coated stainless steel substrate was dried. As a result, a precursor electrode (carbon layer) of the second anode active material layer was manufactured.

The precursor electrode/stainless steel substrate stack was arranged on the solid electrolyte/contact layer assembly such that the contact layer and the carbon layer come into contact, and then was subjected to CIP with a pressure of 250 MPa at 25° C. Then, the stainless steel substrate attached to the precursor electrode was removed therefrom to prepare a second stack in which a contact layer and a precursor electrode were stacked on a solid electrolyte.

Separately, a first stack in which a lithium metal electrode (first layer) was disposed on an anode current collector (first substrate, Cu) was prepared. While the precursor electrode (carbon layer) of the previously prepared second stack and the lithium (Li) metal electrode (first layer) of the first stack were arranged to face each other, CIP was performed thereon with a pressure of 150 MPa at 25° C. to attach the precursor electrode to the lithium metal electrode. As a result, prepared was, on the solid electrolyte, an anode in which a contact layer (Sn) having a thickness of 30 nm, a second anode active material layer (C) having a thickness of 5 μm, and a first anode active material layer (Li) having a thickness of 20 μm, and an anode current collector (Cu) were sequentially stacked.

(Preparation of Cathode and all-Solid Secondary Battery)

A cathode and an all-solid secondary battery were prepared in the same manner as in Example 1, except that the solid electrolyte/anode prepared as described above was used.

Example 5 (Anode Comprising a Lithium Layer, a Carbon Layer, and a Zinc (Zn) Layer (Manufacture of Solid Electrolyte/Anode Stack Subassembly Using Manufacturing Method 3)

A $Li_{6.5}La_3Zr_{1.5}Ta_{0.5}O_{12}$ (LLZO) pellet having a thickness of about 350 μm was prepared.

A solid electrolyte/contact layer assembly was prepared by depositing zinc (Zn) on the solid electrolyte at 25° C. to form a zinc layer having a thickness of about 30 nm to about 100 nm.

The preparation of the anode in which the contact layer (Zn), second anode active material layer (C), first anode active material layer (Li), and the anode current collector (Cu) were sequentially stacked, and the preparation of the cathode and the secondary battery, were performed in the same manner as in Example 4, except that the solid electrolyte/contact layer (Zn) assembly manufactured as described above was used.

(Preparation of Cathode and all-Solid Secondary Battery)

A cathode and an all-solid secondary battery were prepared in the same manner as in Example 1, except that the solid electrolyte/anode prepared as described above was used.

Example 6 (Anode Comprising a Silver-Lithium Ally Layer, Carbon Layer, and Silver (Ag) Layer (Manufacture of Solid Electrolyte/Anode Stack Subassembly Using Manufacturing Method 3)

A $Li_{6.5}La_3Zr_{1.5}Ta_{0.5}O_{12}$ (LLZO) pellet having a thickness of about 350 μm was prepared.

A solid electrolyte/contact layer stack was prepared by depositing silver (Ag) on the solid electrolyte at 25° C. to form a silver (Ag) layer having a thickness of about 200 nm.

Separately, carbon black, as a conducting material and an anode active material, and silver (Ag) nanoparticles alloyable with lithium were mixed with a binder to prepare a slurry, the slurry was evenly coated on a stainless steel substrate having a thickness of 10 μm (a second substrate), and the coated stainless steel substrate was dried. As a result, a precursor electrode (silver-carbon layer) of the second anode active material layer was manufactured.

The precursor electrode of the second anode active material layer was attached to the solid electrolyte/contact layer stack such that the contact layer contacts the silver-carbon (AgC) layer, and CIP was applied thereon with a pressure of 250 MPa at 25° C. Then, the stainless steel substrate attached to the precursor electrode of the second anode active material layer was removed therefrom to prepare a second stack in which a contact layer (Ag) and a second anode active material layer (AgC) were stacked on a solid electrolyte.

Separately, a first stack was prepared in which the precursor electrode (lithium metal) of the first anode active material layer was disposed on the anode current collector (first substrate, Cu). While the carbon surface of the second stack, which is the previously prepared solid electrolyte/contact layer (Ag)/second anode active material layer (AgC) stack, was arranged to face the precursor electrode (lithium metal, first layer) of the first stack, CIP was applied thereto with a pressure of 250 MPa at 25° C. to attach the second anode active material layer (AgC) of the second stack to the precursor electrode of the first anode active material layer. At this time, the precursor electrode (lithium metal) of the first anode active material layer reacts with Ag in the second anode active material layer to form a lithium-silver alloy layer (first anode active material layer). Accordingly, a stack comprising a solid electrolyte/contact layer (Ag)/second anode active material layer (AgC)/first anode active material layer (AgLi)/anode current collector (Cu) was prepared. As a result, on the solid electrolyte, prepared was an anode in which a contact layer (Ag) having a thickness of 200 nm, a second anode active material layer (AgC) having a thickness of 5 μm, a first anode active material layer (AgLi) having a thickness of 20 μm, and an anode current collector (Cu) were sequentially stacked.

(Preparation of Cathode and all-Solid Secondary Battery)

A cathode and an all-solid secondary battery were prepared in the same manner as in Example 1, except that the solid electrolyte/anode prepared as described above was used.

Comparative Example 1: Anode Comprising a Single Lithium Metal Layer (Preparation of Solid Electrolyte/Anode Stack Subassembly)

A $Li_{6.5}La_3Zr_{1.5}Ta_{0.5}O_{12}$ (LLZO) pellet having a thickness of about 350 μm was prepared. An anode prepared by coating a copper (Cu) foil having a thickness of about 10 μm with a lithium (Li) metal at a thickness of about 20 μm, disposing the coated copper foil on a surface of the LLZO pellet, and applying a pressure of 250 MPa at a temperature of 25° C. to the resultant by cold isotactic pressing (CIP) to prepare a solid electrolyte/anode stack subassembly.

(Preparation of Cathode)

$LiNi_{0.8}Co_{0.15}Mn_{0.05}O_2$(NCM) was used as a cathode active material. Also, polytetrafluoroethylene (Teflon®; available from DuPont) was used as a binder. Also, carbon nanofibers (CNFs) were used as a conducting material. Next, the cathode active material, the conducting material, and the binder were mixed at a weight ratio of 100:2:1 to prepare a mixture. The mixture was stretched in the form of sheet to prepare a cathode active material sheet. Also, the cathode active material sheet was pressed on a cathode current collector formed of an aluminum foil having a thickness of about 18 μm to prepare a cathode.

The cathode active material sheet of the cathode was impregnated with an electrolyte solution prepared by dissolving 2.0 M of LiFSI in an ionic liquid, N-propyl-N-methyl-pyrrolidinium bis(fluorosulfonyl)imide (Pyr13FSI).

(Preparation of all-Solid Secondary Battery)

The cathode was disposed in a SUS (stainless steel) cap such that the cathode active material layer impregnated in the ionic liquid electrolyte solution faced upward. The solid electrolyte/anode stack subassembly was disposed such that the solid electrolyte was on the cathode active material layer, and the resultant was sealed to prepare an all-solid secondary battery.

The cathode and the anode were insulated with an insulator. Portions of the cathode current collector and the anode current collector were exposed to the outside of the sealed battery and used as a cathode terminal and an anode terminal.

Comparative Example 2 (Anode Comprising a Lithium-Alloy Layer and Carbon-Metal Composite Layer (Preparation of Solid Electrolyte/Anode Stack Subassembly)

A $Li_{6.5}La_3Zr_{1.5}Ta_{0.5}O_{12}$ (LLZO) pellet having a thickness of about 350 μm was prepared. Meanwhile, a first stack in which a lithium (Li) metal having a thickness of 20 μm was coated on a copper (Cu) foil, which is an anode current collector having a thickness of 10 μm, was prepared.

Separately, prepared was a second stack in which a second anode active material layer having a composite (AgC) was disposed on a stainless steel substrate having a thickness of 10 μm. Herein, the composite (AgC) includes a carbon active material and silver (Ag) and has a thickness of 10 μm.

The second anode active material layer was prepared by mixing carbon black (CB) having a particle size of about 38 nm, which is a carbon-based material, and silver (Ag) nanoparticle powder, and a mixture obtained by mixing 2.692 g of a PVDF binder solution (Solvay, Solef5130) with 7 g of methylpyrrolidone (N-methylpyrrolidone, N-Methyl-2-pyrrolidone, NMP) was added thereto. The resultant was stirred at 1000 rotations per minute (rpm) for 30 minutes to prepare a slurry, which was then bar-coated on a stainless steel substrate. The coated stainless steel substrate was dried at room temperature (25° C.) for 1 hour and then vacuum dried for 12 hours to prepare a metal-containing second stack of a second anode active material layer (AgC)/stainless steel substrate.

The second stack of the second anode active material layer (AgC)/stainless steel substrate and the first stack of the first anode active material layer (Li metal)/anode current collector, the second anode active material layer (AgC) and the first anode active material layer (Li metal) were arranged to be in contact with each other, and a pressure of 10 MPa was applied thereto using an uni-axial press at a temperature of 25° C. to prepare a stainless steel substrate/second anode active material layer/first anode active material layer/anode current collector stack. Then, the stainless steel substrate attached to the second anode active material layer was removed therefrom, thereby preparing a first stack in which the first anode active material layer and the second anode active material layer were sequentially stacked on the anode current collector.

The first stack was placed on a solid electrolyte such that the second anode active material layer (AgC) faces one surface of the solid electrolyte (LLZO pellet), and CIP was applied thereto with the intensity of 10 MPa at 25° C. to obtain such a structure that the second anode active material layer, the first anode active material layer, and the anode current collector, which constitute an anode, were sequentially stacked on the solid electrolyte.

(Preparation of Cathode and all-Solid Secondary Battery)

A cathode and an all-solid secondary battery were prepared in the same manner as in Comparative Example 1, except that the solid electrolyte/anode prepared as described above was used.

Comparative Example 3: Anode Comprising a Contact Layer and Second Anode Active Material Layer (Carbon Layer)

(Preparation of Solid Electrolyte/Anode Stack Subassembly)

A $Li_{6.5}La_3Zr_{1.5}Ta_{0.5}O_{12}$ (LLZO) pellet having a thickness of about 350 μm was prepared. Prepared was, on a surface of LLZO pellet, a second stack in which a contact layer was stacked on a solid electrolyte by stacking silver (Ag) at 25° C. to form an Ag layer having a thickness of about 100 nm.

Separately, carbon black, which is used as an anode active material and a conductive material, was mixed with a binder to prepare a slurry, and then, the slurry was uniformly coated on a copper (Cu) foil (anode current collector) having a thickness of 10 μm, and the coated Cu foil was dried. For the carbon layer, a mixture obtained by adding 2.692 g of a PVDF binder solution (Solvay, Solef5130) to 7 g of methylpyrrolidone (N-methylpyrrolidone, N-Methyl-2-pyrrolidone, NMP) was added to carbon black (CB) having a particle size of about 38 nm, and the resultant was first stirred at 1000 rpm for 30 minutes to prepare a slurry, which was then bar-coated on a copper foil (anode current collector). The coated copper foil was dried at room temperature (25° C.) for 1 hour, and then vacuum dried for 12 hours to obtain a first stack in which the carbon layer was stacked on the anode current collector.

The first stack in which the carbon layer is stacked on the anode current collector was arranged with respect to the second stack in which the contact layer is stacked on the solid electrolyte while the contact layer was in contact with the carbon layer, and CIP was applied thereto with a pressure of 10 MPa at 25° C. to prepare a solid electrolyte/anode stack subassembly in which the contact layer, the carbon layer, and the anode current collector were sequentially stacked.

(Preparation of Cathode and all-Solid Secondary Battery)

A cathode and an all-solid secondary battery were prepared in the same manner as in Comparative Example 1, except that the solid electrolyte/anode prepared as described above was used.

Comparative Example 4: Anode Comprising a Contact Layer and First Anode Active Material Layer (Indium Layer (Preparation of Solid Electrolyte/Anode Stack Subassembly)

A $Li_{6.5}La_3Zr_{1.5}Ta_{0.5}O_{12}$ (LLZO) pellet having a thickness of about 350 μm was prepared. Prepared was, on a surface of LLZO pellet, a second stack in which a contact layer was stacked on a solid electrolyte by stacking silver (Ag) at 25° C. to form a silver (Ag) layer having a thickness of about 100 nm.

Separately, a first stack of an anode current collector/ indium metal layer in which indium (In) metal having a thickness of 50 μm was pressed on a copper (Cu) foil having a thickness of 10 μm, which is an anode current collector, was prepared.

The first stack was arranged on the second stack such that the indium (In) metal layer faces the silver (Ag) contact layer, and then, CIP was applied thereto with a pressure of 10 MPa at 25° C., and the contact layer (Ag) on the solid electrolyte to prepare such a structure in which the contact layer (Ag), the indium metal layer, and the anode current collector, which constitute the anode, were sequentially stacked on the solid electrolyte.

(Preparation of Cathode and all-Solid Secondary Battery)

A cathode and an all-solid secondary battery were prepared in the same manner as in Comparative Example 1, except that the solid electrolyte/anode prepared as described above was used.

Comparative Example 5 (Anode Comprising a Lithium Layer and Carbon Layer without Contact Layer (Preparation of Solid Electrolyte/Anode Stack Subassembly)

A solid electrolyte having a $Li_{6.5}La_3Zr_{1.5}Ta_{0.5}O_{12}$ (LLZO) pellet having a thickness of about 350 μm was prepared.

Meanwhile, a stack of a first anode active material layer/ anode current collector in which a lithium (Li) metal having a thickness of 20 μm was coated on a copper (Cu) foil having a thickness of 10 μm, which is an anode current collector, was prepared.

Separately, a second anode active material layer/stainless steel substrate stack was prepared in which a second anode active material layer containing a carbon-based active material and having a thickness of 10 μm was placed on a stainless steel substrate having a thickness of 10 μm. The second anode active material layer/stainless steel substrate stack was prepared by mixing carbon black (CB) having a particle size of about 38 nm, which is a carbon-based material, with a mixture obtained by mixing 2.692 g of a PVDF binder solution (Solvay, Solef5130) with 7 g of methylpyrrolidone (N-methylpyrrolidone, N-Methyl-2-pyrrolidone, NMP). The resultant was first stirred at 1000 rpm for 30 minutes to prepare a slurry, which was then bar-coated on a stainless steel substrate. The coated stainless steel substrate was dried at room temperature (25° C.) for 1 hour, and then vacuum dried for 12 hours to obtain a second stack of a second anode active material layer (carbon)/stainless steel substrate.

The second stack of the second anode active material layer (carbon)/stainless steel substrate and the first stack of the first anode active material layer (Li metal)/anode current collector were arranged such that the second anode active material layer is in contact with the first anode active material layer, and a pressure of 10 MPa was applied thereto using an uni-axial press at a temperature of 25° C. to prepare a stainless steel substrate/second anode active material layer (carbon)/first anode active material layer (lithium)/anode current collector stack. Then, the stainless steel substrate attached to the second anode active material layer was removed to prepare a stack (first stack) of second anode active material layer (carbon)/first anode active material layer (lithium)/anode current collector.

The first stack was placed on a solid electrolyte such that the second anode active material layer (carbon) faces a surface of the solid electrolyte (LLZO), and then, CIP was applied thereto with a pressure of 10 MPa at 25° C. to obtain such a structure that the second anode active material layer (carbon), the first anode active material layer (lithium), and the anode current collector, of an anode, were sequentially stacked on the solid electrolyte.

(Preparation of Cathode and all-Solid Secondary Battery)

A cathode and an all-solid secondary battery were prepared in the same manner as in Comparative Example 1, except that the solid electrolyte/anode prepared as described above was used.

Evaluation Example 1: Evaluation of Interfacial Resistance

Interfacial resistance of the full-cells prepared in Comparative Examples 1 and 2 and Example 1 were each measured.

Impedance of the pellets was measured by a 2-probe method using an impedance analyzer (Solartron 1400A/ 1455A impedance analyzer) with respect to the full-cells prepared in Comparative Examples 1 and 2 and Example 1. A frequency range was in a range of about 0.1 Hertz (Hz) to about 1 MHz, and an amplitude voltage was about 10 millivolts (mV).

The measurement was performed in the air atmosphere at a temperature of about 25° C. The Nyquist plots of the impedance measurement results are shown in FIGS. 16 and 17.

Figure 16:
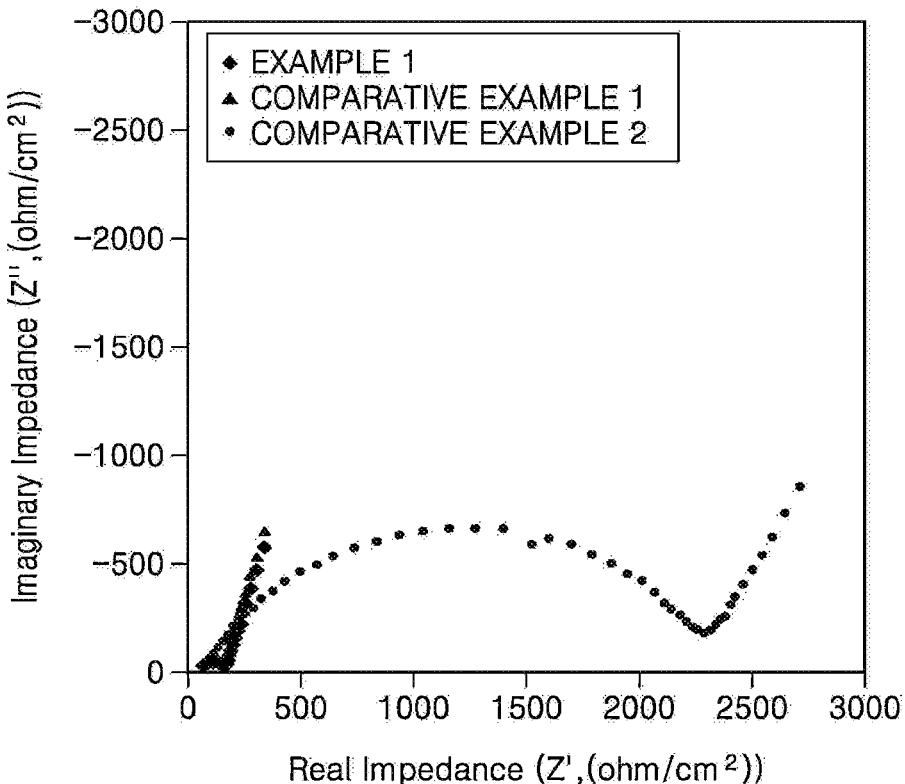
FIG. 16 is a Nyquist plot of imaginary impedance (Z", ohms per square centimeter, ohm/cm$^2$) versus real impedance (Z', ohm/cm$^2$) showing the impedance measurement results of Comparative Examples 1 and 2 and Example 1.
Figure 17:
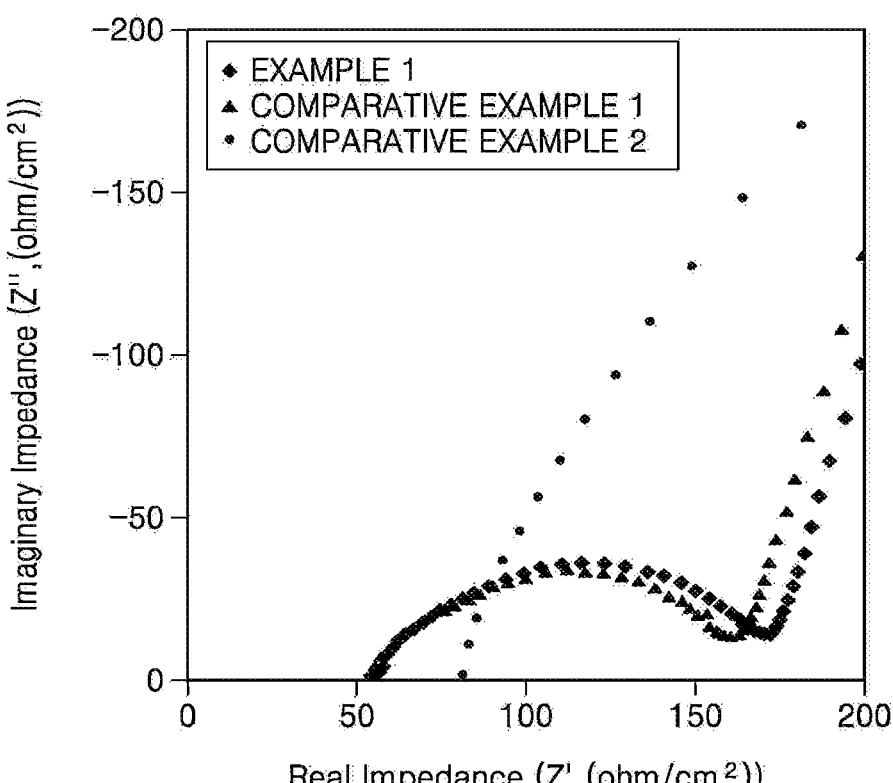
FIG. 17 is an enlarged view of a portion of FIG. 16.

Referring to FIGS. 16 and 17, an interfacial resistance of a structure having an anode in which a carbon layer is in direct contact with a solid electrolyte (Comparative Example 2) was greater than about 2,000 Ohm·cm$^2$, but an interfacial resistance of a structure having an anode in which a lithium metal layer or lithium alloy layer is in contact with a solid electrolyte (Comparative Example 1 and Example 1) was less than about 2,000 Ohm·cm$^2$.

Evaluation Example 2: Charging/Discharging Test

Charge/discharge characteristics of the all-solid secondary batteries prepared in Comparative Examples 1, 2, 4 and 5 and Examples 1, 3, 4, 5, and 6 were evaluated by the following charge/discharge test. The charge/discharge test of the all-solid secondary battery according to Comparative Examples 1, 2, 4 and Example 1 were performed by charging and discharging of the batteries while changing a current density under a temperature condition of about 60° C. to confirm driving characteristics of the all-solid secondary batteries in a high current density state, wherein a 70 μm thick LLZO solid electrolyte and NCM622 (4.4 mAh/cm$^2$) cathode were used. The charge/discharge test of the all-solid secondary battery according to Comparative Example 5 and Examples 3, 4, and 5 were performed by charging and discharging of the batteries while changing a current density under a temperature condition of about 25° C. to confirm driving characteristics of the all-solid secondary batteries in a high current density state, wherein a 500 μm thick LLZO solid electrolyte and NCA (5.1 mAh/cm$^2$) cathode were used. The charge/discharge test of the all-solid secondary battery according to Example 6 was performed by charging and discharging of the batteries while changing a current density under a temperature condition of about 25° C. to confirm driving characteristics of the all-solid secondary batteries in a high current density state, wherein a 100 μm thick LLZO solid electrolyte and NCM (3.2 mAh/cm$^2$) cathode were used.

Figure 18:
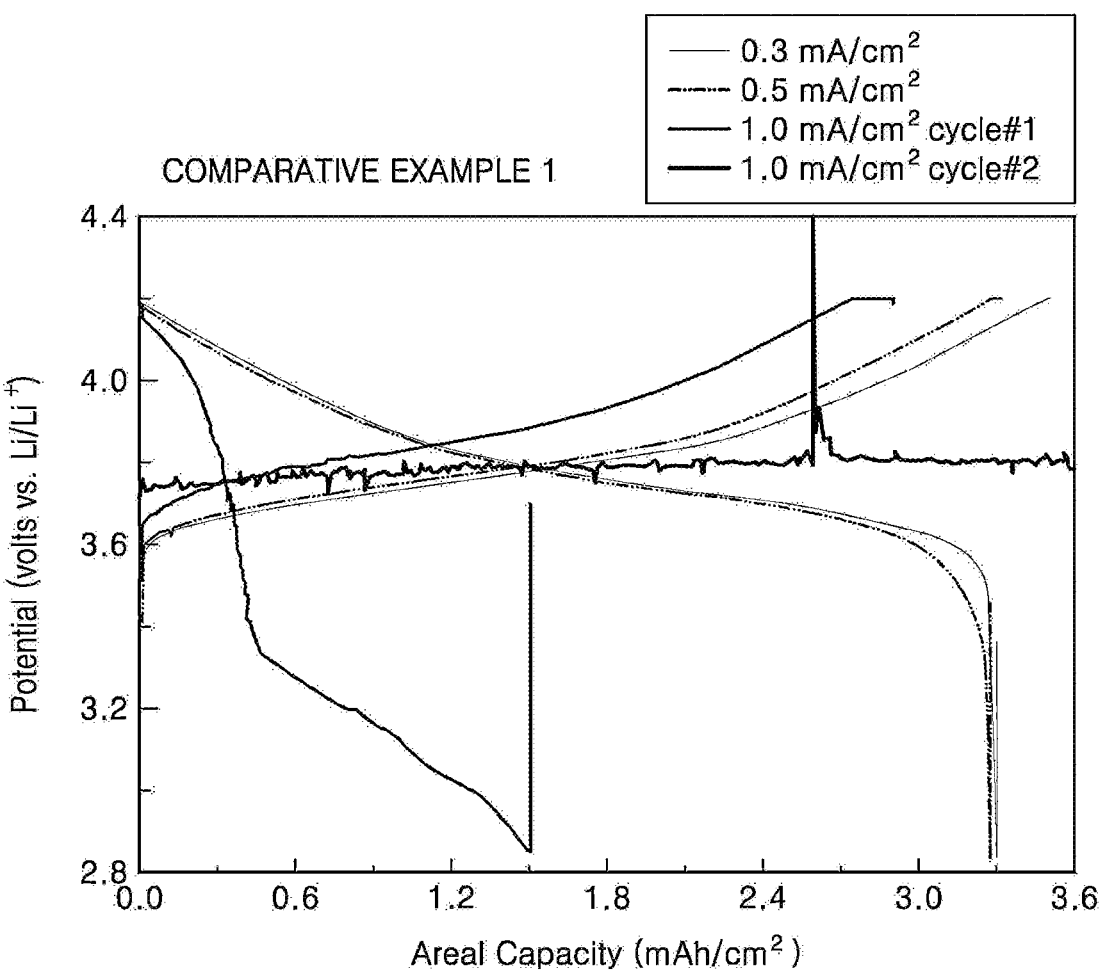
FIGS. 18 to 26 are each a graph of potential (volts versus Li/Li$^+$) versus areal capacity (milliampere hours per square centimeter, mAh/cm$^2$), showing the charge/discharge curves of all-solid secondary batteries including the anodes prepared in accordance with Comparative Examples 1 to 5 and Examples 1 to 6.
Figure 19:
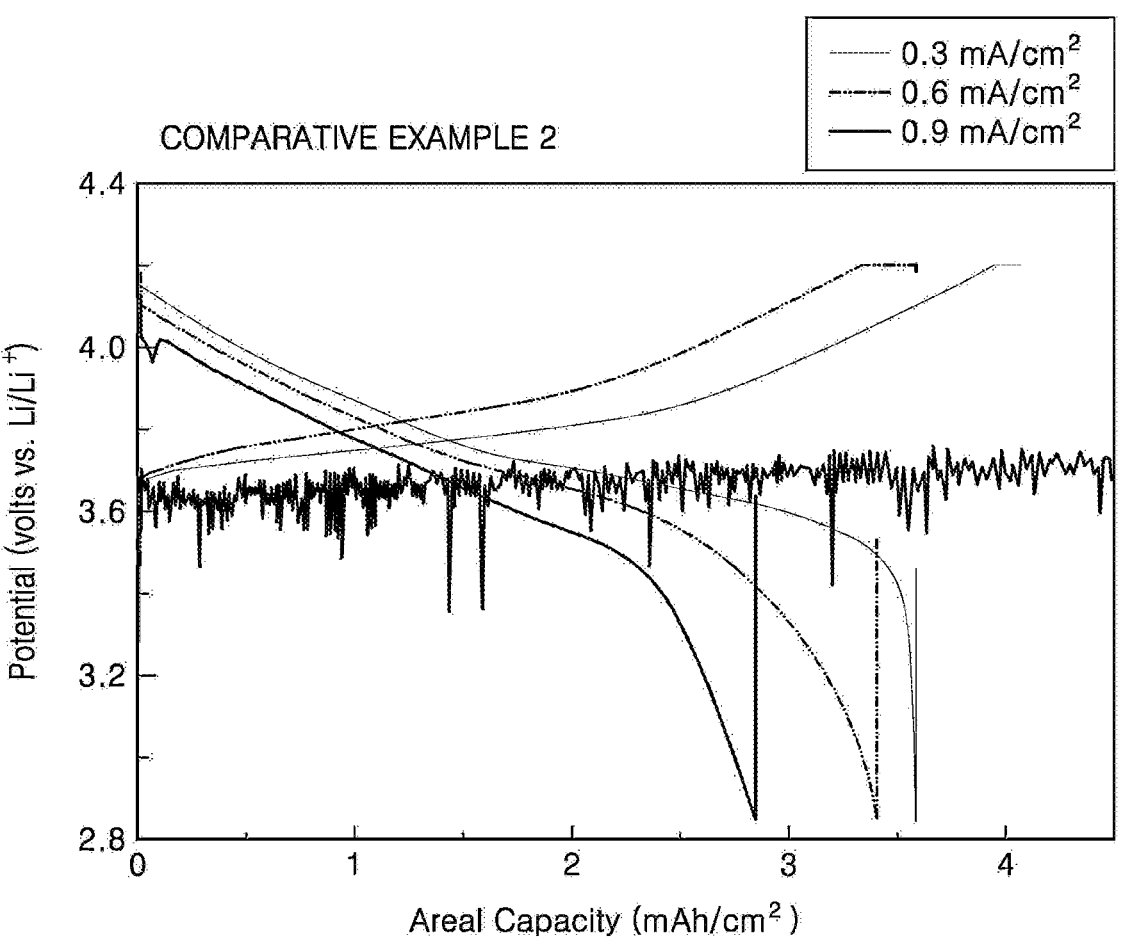
Figure 20:
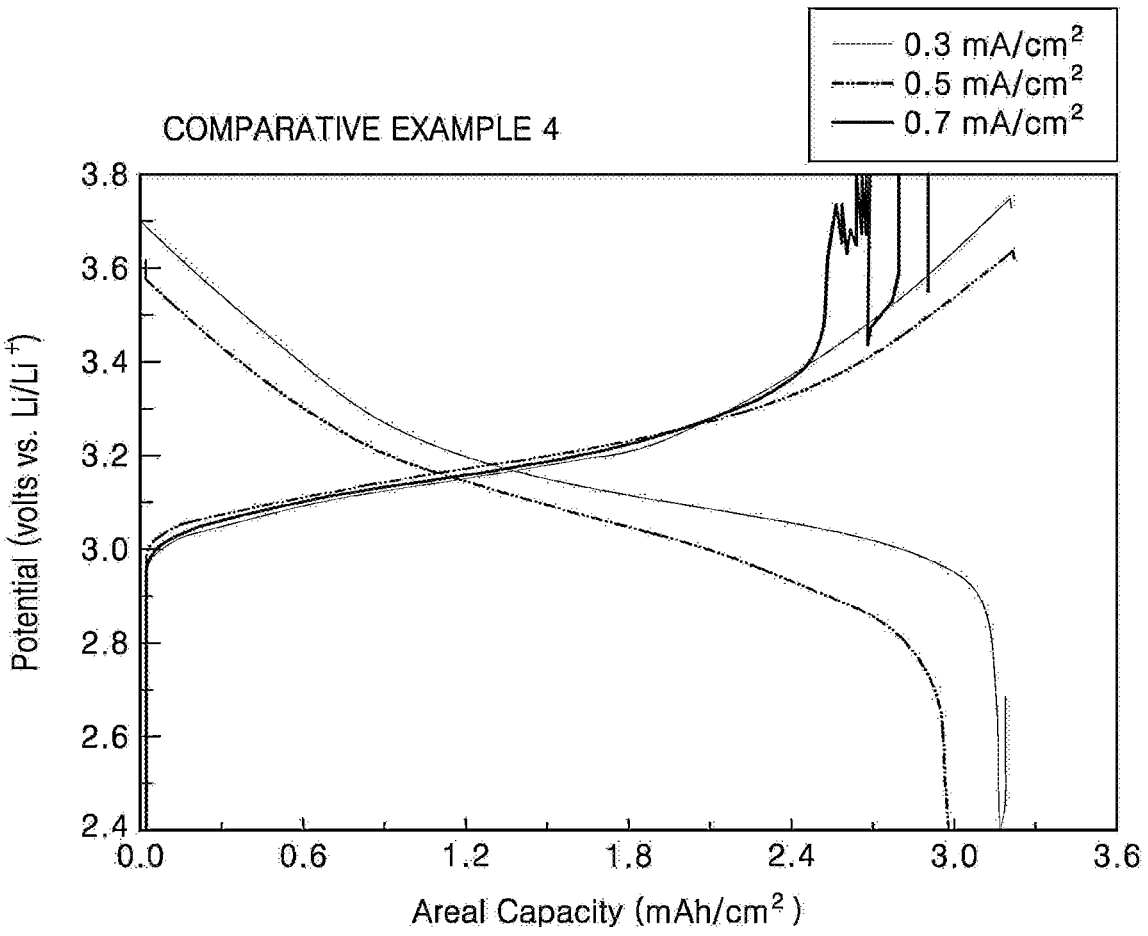

As shown in FIG. 18, a structure having an anode formed of a single lithium metal layer (Comparative Example 1) had short-circuits occur at about 1.0 mA/cm$^2$, and, as shown in FIG. 19, a structure having an anode in which a carbon layer directly contacting a solid electrolyte (Comparative Example 2) had short-circuits occurred at about 0.9 mA/cm$^2$. As shown in FIG. 20, even though the contact layer and the first anode active material layer were included, a short circuit occurred at 0.7 mA/cm$^2$ in the structure having an anode that does not include a carbon layer (Comparative Example 4).

Figure 21:
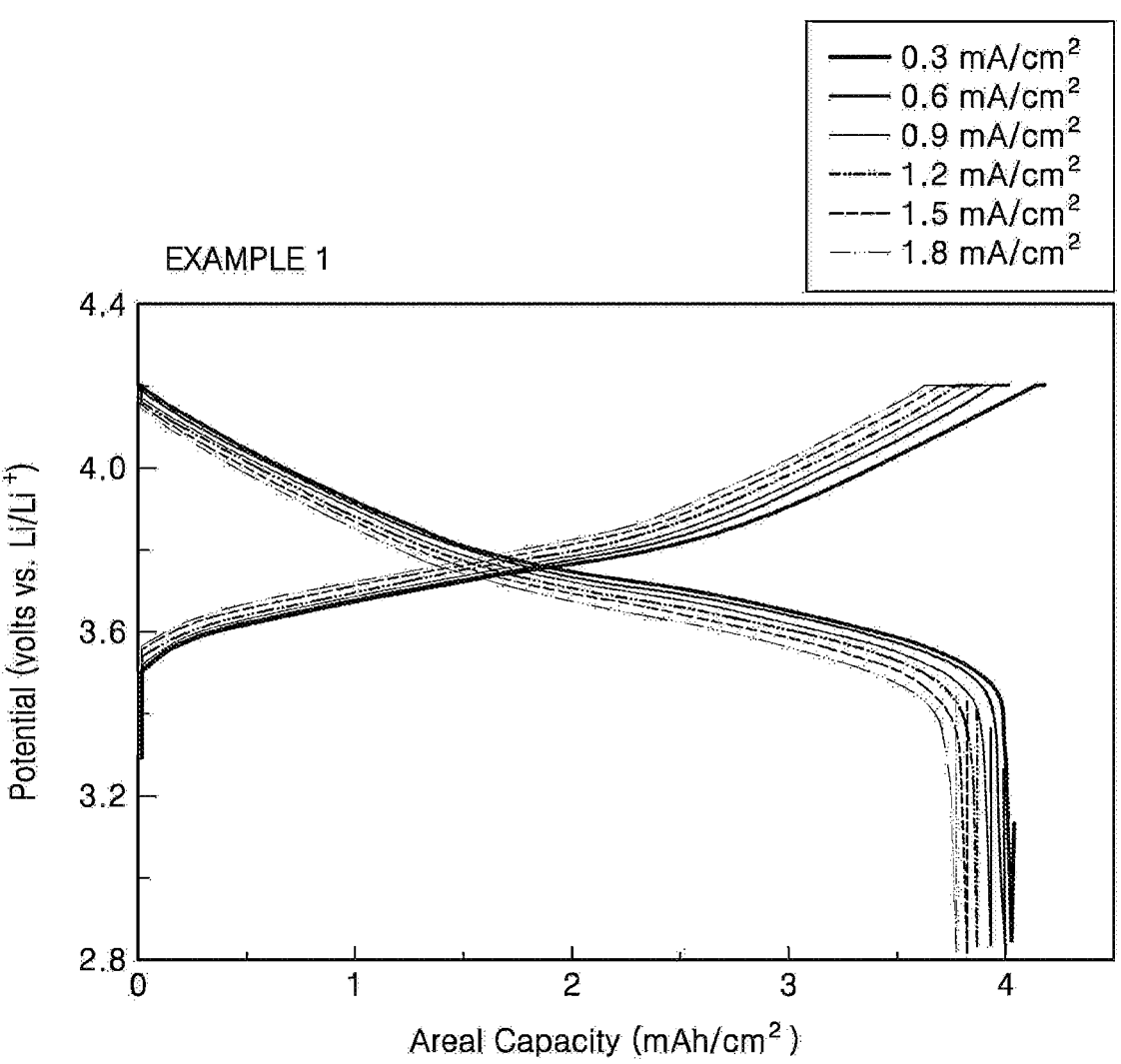

On the other hand, as shown in FIG. 21, in a structure having a multilayer structure in which a thin Li—Ag alloy layer is in contact with a solid electrolyte (Example 1), stable operation was possible without short-circuit occurrence until 1.8 mA/cm$^2$.

Figure 22:
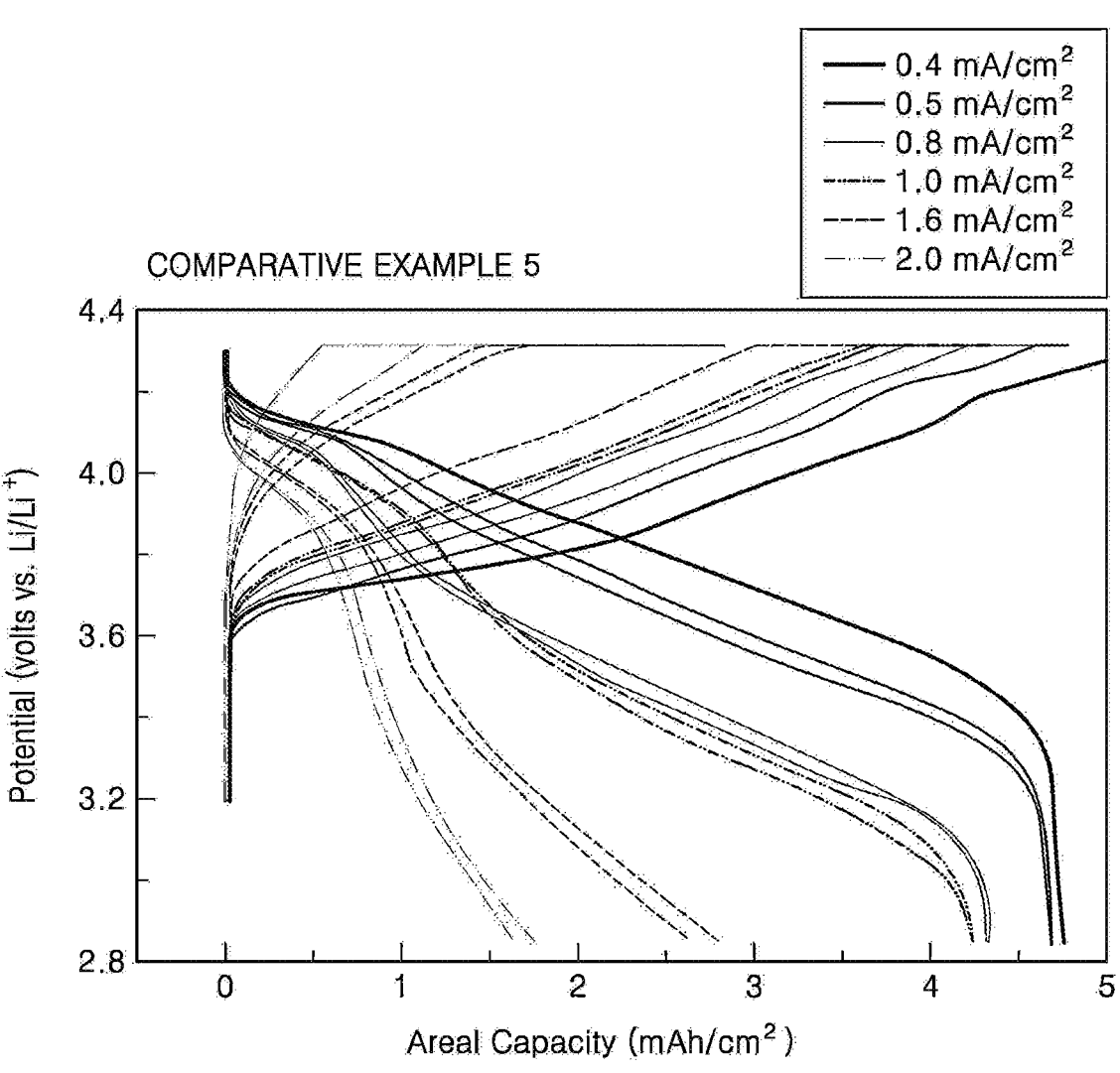

Meanwhile, as shown in FIG. 22, in the case of the structure having an anode formed of a first anode active material layer and a second anode active material layer in which a contact layer is not present (Comparative Example 5), the discharge capacity varied depending on the current density. For example, at 2.0 mA/cm$^2$, the discharge capacity was 2 mAh/cm$^2$ or less.

Figure 23:
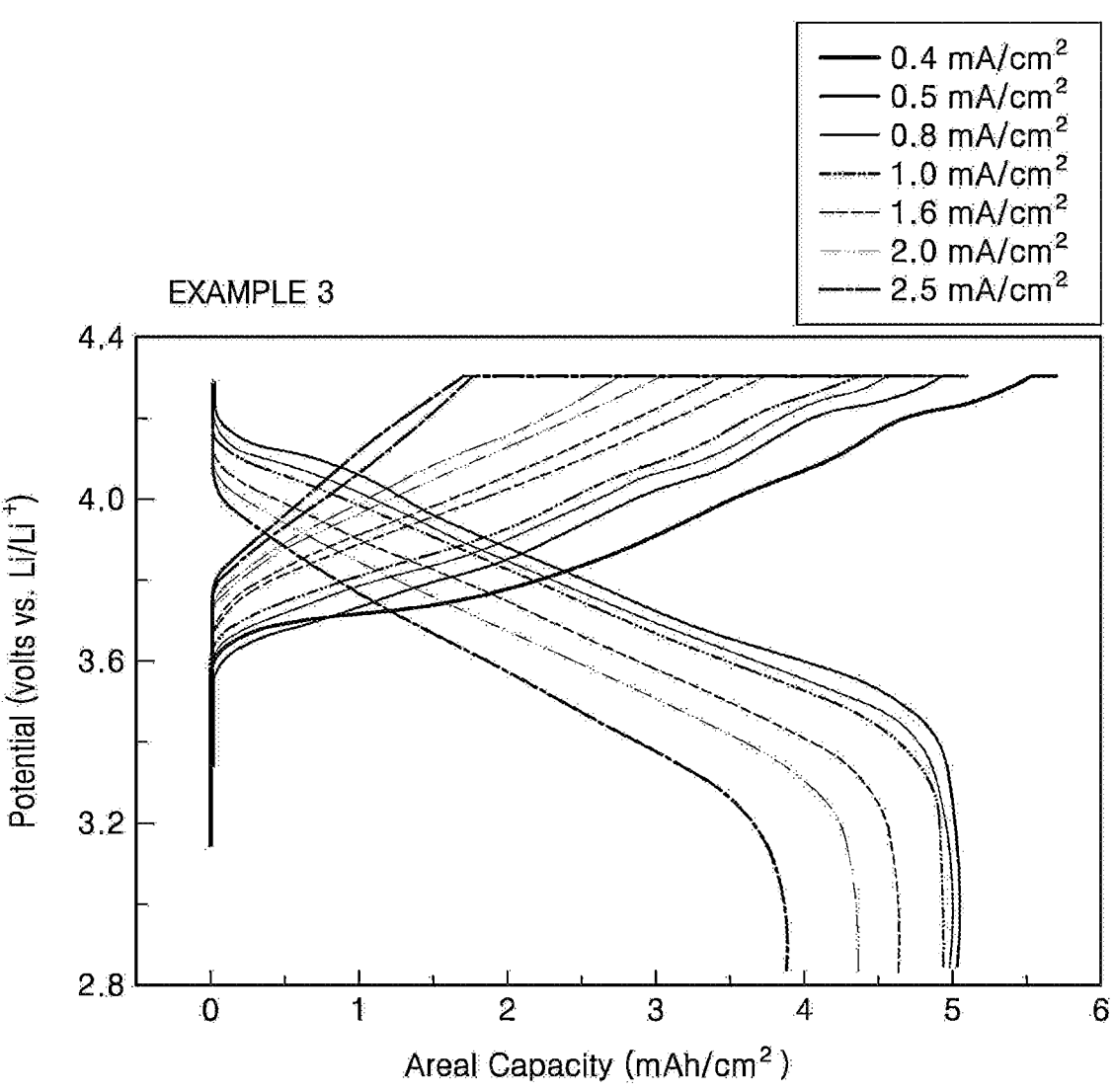
Figure 24:
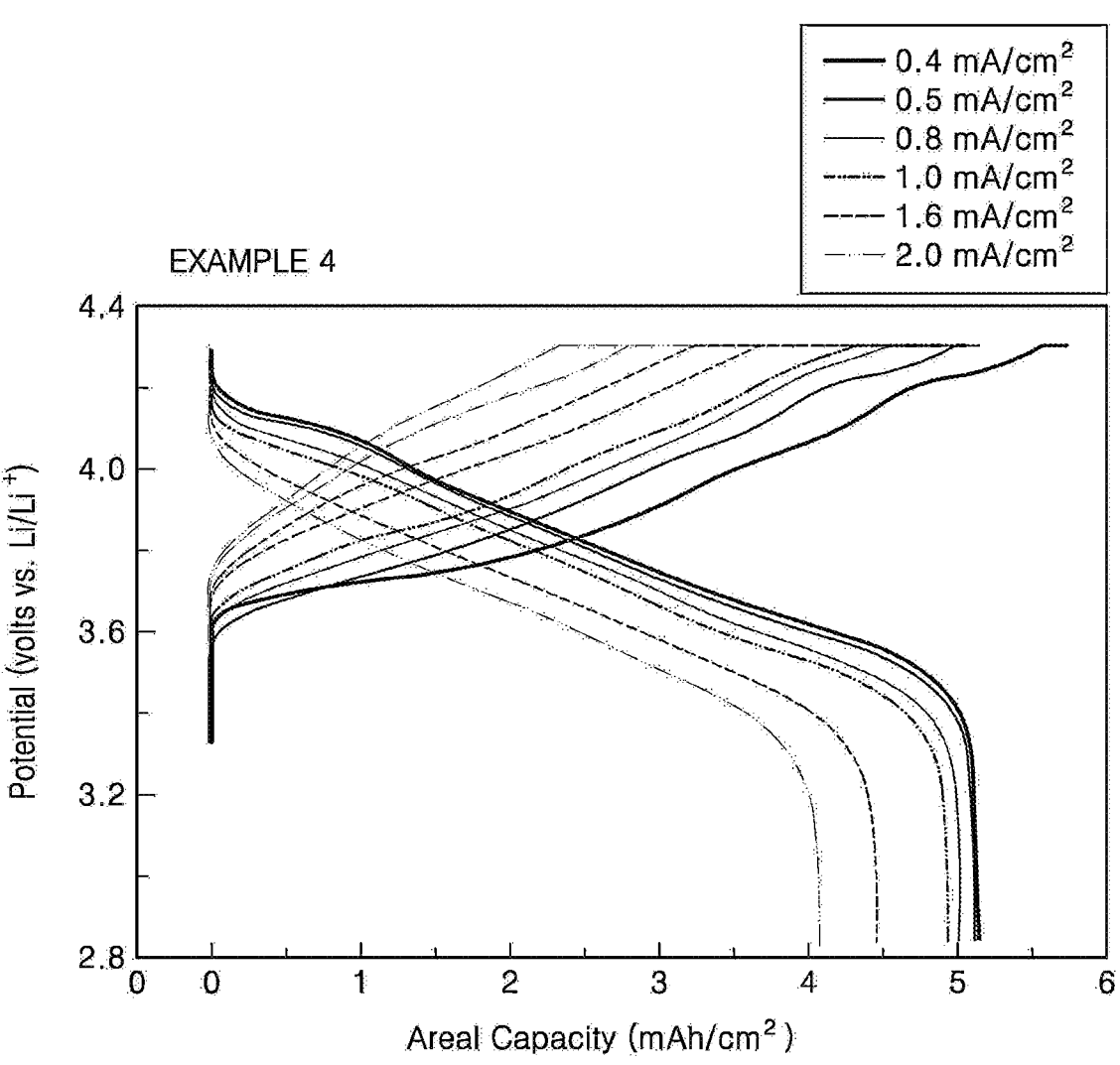
Figure 25:
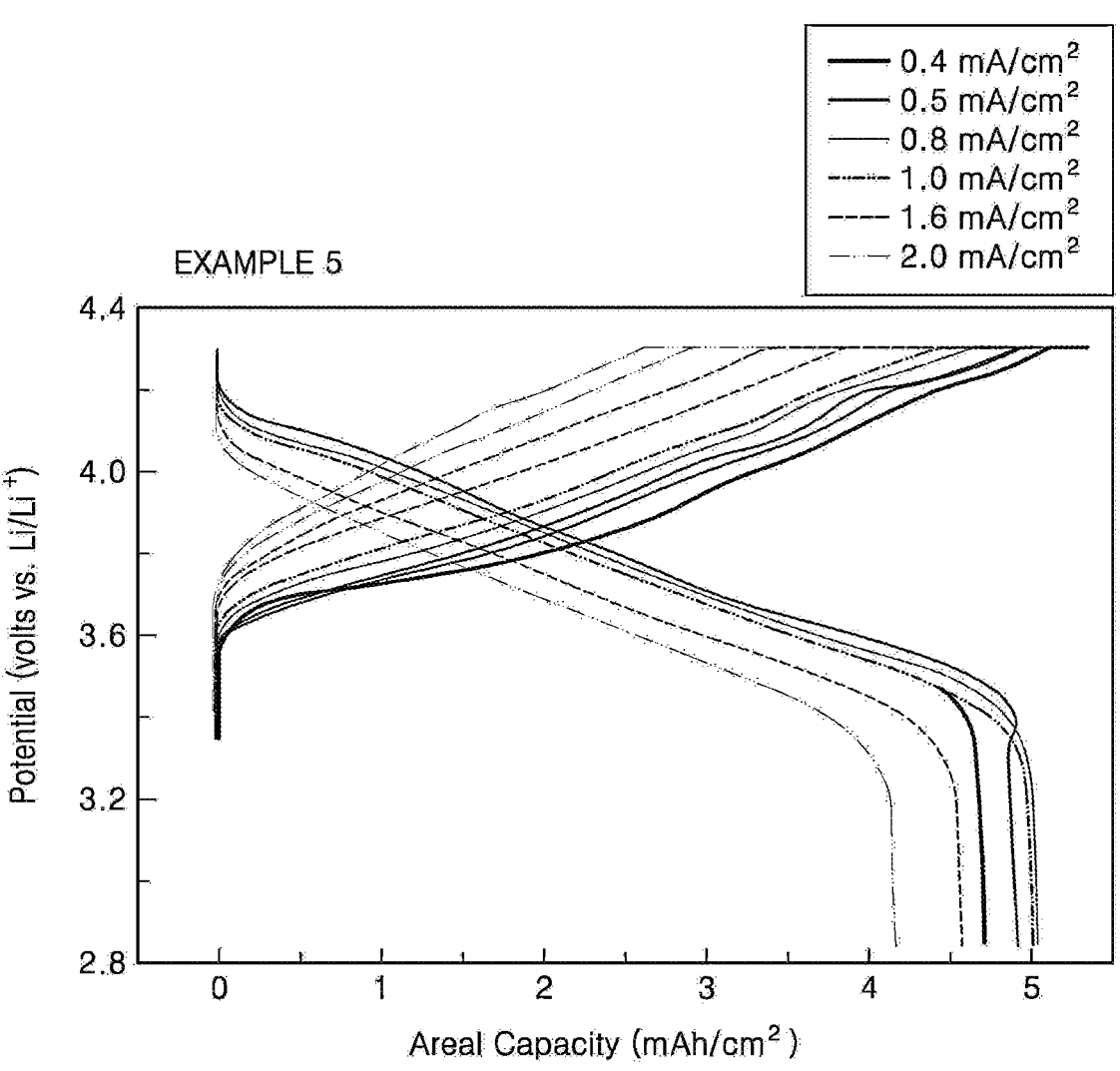
Figure 26:
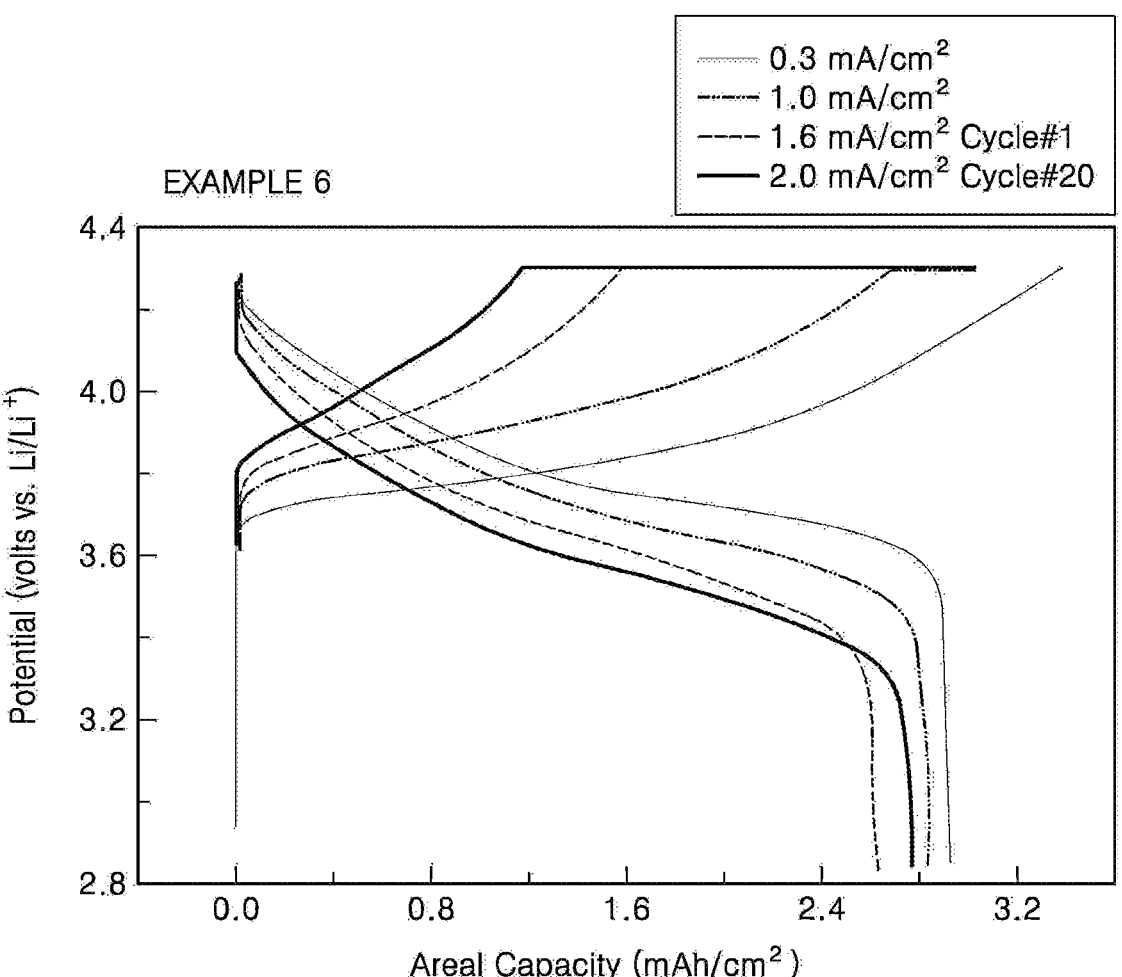

On the other hand, as shown in FIG. 23, in the case of a structure having a multilayer structure in which a thin Ag metal layer is in contact with a solid electrolyte (Example 3), the driving was stably performed without short circuits until 2.5 mA/cm$^2$, and the difference in the discharge capacity according to the current density was small. For example, at 2.0 mA/cm$^2$, the discharge capacity was 4 mAh/cm$^2$ or greater. As shown in FIG. 24, in the case of a structure having a multilayer structure in which a thin Sn metal layer is in contact with a solid electrolyte (Example 4), the driving was stably performed without short circuits until 2.0 mA/cm$^2$, and the difference in the discharge capacity according to the current density was small. For example, at 2.0 mA/cm$^2$, the discharge capacity was 4 mAh/cm$^2$ or greater. As shown in FIG. 25, in the case of a structure having a multilayer structure in which a thin Zn metal layer is in contact with a solid electrolyte (Example 5), the driving was stably performed without short circuits until 2.0 mA/cm$^2$, and the difference in the discharge capacity according to the current density was small. For example, at 2.0 mA/cm$^2$, the discharge capacity was 4 mAh/cm$^2$ or greater. As shown in FIG. 26, in the case of a structure having a multilayer structure in which a thin Ag metal layer is in contact with a solid electrolyte (Example 6), the driving was stably performed without short circuits until 1.6 mA/cm$^2$, and the difference in the discharge capacity according to the current density was small. For example, at 1.6 mA/cm$^2$, the discharge capacity was 2.4 mAh/cm$^2$ or greater.

From this result, it may be evaluated as that an anode having a multi-layered structure in which a thin metal layer is in contact with a solid electrolyte may have a reduced volume change occurring during the charging/discharging, and that short-circuits of an all-solid secondary battery including the anode may be prevented by reducing a current being topically focused at a high current density.

As described above, according to one or more embodiments, an all-solid secondary battery and a method of preparing the all-solid secondary battery may prevent cracks of a solid electrolyte and may reduce an interfacial resistance between an anode and the solid electrolyte.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery, comprising:

a cathode;

an anode; and a solid electrolyte disposed between the cathode and the anode, wherein the anode comprises an anode current collector;

a first anode active material layer in contact with the anode current collector and comprising a first metal;

a second anode active material layer disposed between the first anode active material layer and the solid electrolyte and comprising a carbon-containing active material; and a contact layer between the second anode active material layer and the solid electrolyte, the contact layer comprising a second metal, and having a thickness less than a thickness of the first anode active material layer, wherein the second metal comprises lithium metal, a lithium alloy, a metal alloyable with lithium, or a combination thereof.

2. The all-solid secondary battery of claim 1, wherein the first metal comprises lithium metal, or a lithium alloy.

3. The all-solid secondary battery of claim 1, wherein the thickness of the contact layer is about 0.1% to about 20% of the thickness of the first anode active material layer.

4. The all-solid secondary battery of claim 1, wherein the thickness of the contact layer is about 30 nanometers to about 1 micrometer.

5. The all-solid secondary battery of claim 1, wherein the thickness of the contact layer is less than a thickness of the second anode active material layer.

6. The all-solid secondary battery of claim 1, wherein during a charge/discharge cycle, a volume change of the first anode active material layer is greater than a volume change of the contact layer.

7. The all-solid secondary battery of claim 1, wherein during a charge/discharge cycle, a volume change of the second anode active material layer is greater than a volume change of the contact layer.

8. The all-solid secondary battery of claim 1, wherein a volume of the contact layer after charge is about 1.5 times to about 20 times a volume of the contact layer after discharge.

9. The all-solid secondary battery of claim 1, wherein a volume of the first anode active material layer after charge is about 1.5 times to about 500 times a volume of the first anode active material layer after discharge.

10. The all-solid secondary battery of claim 1, wherein a volume of the second anode active material layer after charge is greater than a volume of the second anode active material layer after discharge, and the volume of the second anode active material layer after charge is about 2 times or less the volume of the second anode active material layer after discharge.

11. The all-solid secondary battery of claim 1, wherein the solid electrolyte comprises an oxide-containing solid electrolyte.

12. The all-solid secondary battery of claim 1, wherein the second anode active material layer further comprises a metal.

13. The all-solid secondary battery of claim 1, wherein lithium is deposited in the first anode active material layer when the all-solid secondary battery is charged.

14. A method of manufacturing an all-solid secondary battery, the method comprising:
  providing a first stack comprising
    a first layer comprising lithium metal or a lithium alloy on a first substrate, and
    a second layer comprising a carbon-containing active material on the first layer;
  providing a second stack comprising a third layer disposed on a solid electrolyte, wherein the third layer comprises lithium metal, a lithium alloy, a metal alloyable with lithium, or a combination thereof;
  disposing the first stack on the second stack such that the second layer and the third layer face each other, and
  pressing the first stack and the second stack such that the first stack and the second stack move closer to each other to attach the second layer to the third layer; and
  providing a cathode on the solid electrolyte opposite the third layer to manufacture the all-solid secondary battery, wherein the third layer is disposed between the second layer and the solid electrolyte, and a thickness of the third layer is less than a thickness of the first layer.

15. The method of claim 14, wherein the providing the first stack comprises
  providing the first layer disposed on the first substrate and the second layer disposed on a second substrate, and
  disposing the first layer and the second layer to face each other, and pressing the first substrate and the second substrate such that the first layer and the second layer move closer to each other.

16. The method of claim 15, wherein in the providing the first stack, the second substrate is removed from the second layer, and the first substrate is an anode current collector.

17. A method of manufacturing an all-solid secondary battery, the method comprising:
  providing a first stack comprising
    a first layer comprising lithium metal or a lithium alloy on a first substrate;
  providing a second stack comprising
    a second layer comprising a carbon-containing active material, and
    a third layer disposed on a solid electrolyte, wherein the third layer comprises lithium metal, a lithium alloy, a metal alloyable with lithium, or a combination thereof;
  disposing the first stack and the second stack such that the first layer and the second layer face each other;
  pressing the first stack and the second stack such that the first stack and the second stack move closer to each other to attach the first layer to the second layer; and
  providing a cathode on the solid electrolyte opposite the third layer to manufacture the all-solid secondary battery,
  wherein the third layer is thinner than the first layer.

18. The method of claim 17, wherein in the providing the second stack comprises
  providing the third layer disposed on the solid electrolyte and the second layer disposed on a second substrate, and
  disposing the third layer and the second layer to face each other, and pressing the second substrate and the solid electrolyte such that the third layer and the second layer move closer to each other.

19. The method of claim 18, wherein in the providing the second stack, the second substrate is removed from the second layer, and the first substrate is an anode current collector.

20. A solid electrolyte/anode stack subassembly for an all-solid secondary battery, the solid electrolyte/anode stack subassembly comprising:
  an anode current collector;
  a first anode active material layer in contact with the anode current collector and comprising a first metal;
  a second anode active material layer disposed between the first anode active material layer and a solid electrolyte, and comprising a carbon-containing active material; and
  a contact layer between the second anode active material layer and the solid electrolyte, the contact layer comprising a second metal, and having a thickness less than a thickness of the first anode active material layer,
  wherein the second metal comprises lithium metal, a lithium alloy, a metal alloyable with lithium, or a combination thereof.

21. A method of manufacturing a solid electrolyte/anode stack subassembly of claim 20, the method comprising providing a first stack comprising a first layer comprising lithium metal or a lithium alloy on a first substrate, and a second layer comprising a carbon-containing active material on the first layer;

providing a second stack comprising a third layer disposed on a solid electrolyte, wherein the third layer comprises lithium metal, a lithium alloy, a metal alloyable with lithium, or a combination thereof; and disposing the first stack on the second stack such that the second layer and the third layer face each other, and pressing the first stack and the second stack such that the first stack and the second stack move closer to each other to attach the second layer to the third layer, wherein the third layer is disposed between the second layer and the solid electrolyte, and a thickness of the third layer is less than a thickness of the first layer.

22. A method of manufacturing a solid electrolyte/anode stack subassembly of claim 20, the method comprising providing a first stack comprising a first layer comprising lithium metal or a lithium alloy on a first substrate;

providing a second stack comprising a second layer comprising a carbon-containing active material, and a third layer disposed on a solid electrolyte, wherein the third layer comprises lithium metal, a lithium alloy, a metal alloyable with lithium, or a combination thereof;

disposing the first stack and the second stack such that the first layer and the second layer face each other; and pressing the first stack and the second stack such that the first stack and the second stack move closer to each other to attach the first layer to the second layer, wherein the third layer is thinner than the first layer.

23. The all-solid secondary battery of claim 1, wherein the metal alloyable with lithium comprises at least one element of aluminum (Al), tin (Sn), indium (In), silver (Ag), gold (Au), zinc (Zn), germanium (Ge), or silicon (Si).

24. The method of claim 14, wherein the metal alloyable with lithium comprises at least one element of aluminum (Al), tin (Sn), indium (In), silver (Ag), gold (Au), zinc (Zn), germanium (Ge), or silicon (Si).

25. The method of claim 17, wherein the metal alloyable with lithium comprises at least one element of aluminum (Al), tin (Sn), indium (In), silver (Ag), gold (Au), zinc (Zn), germanium (Ge), or silicon (Si).

26. The solid electrolyte/anode stack subassembly for an all-solid secondary battery of claim 25, wherein the metal alloyable with lithium comprises at least one element of aluminum (Al), tin (Sn), indium (In), silver (Ag), gold (Au), zinc (Zn), germanium (Ge), or silicon (Si).

* * * * *